(12) United States Patent
Jang et al.

(10) Patent No.: US 10,698,461 B2
(45) Date of Patent: Jun. 30, 2020

(54) ELECTRONIC DEVICE AND HEAT CONTROL METHOD BASED ON TEMPERATURE OF BATTERY IN ELECTRONIC DEVICE

(71) Applicant: Samsung Electronics Co., Ltd., Gyeonggi-do (KR)

(72) Inventors: Ki Youn Jang, Gyeonggi-do (KR); Kyung Ha Koo, Seoul (KR); Kun Tak Kim, Gyeonggi-do (KR); Hyun Tae Jang, Seoul (KR); Chi Hwan Jeong, Gyeonggi-do (KR); Chi Hyun Cho, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 154 days.

(21) Appl. No.: 15/849,862

(22) Filed: Dec. 21, 2017

(65) Prior Publication Data
US 2018/0181171 A1 Jun. 28, 2018

(30) Foreign Application Priority Data

Dec. 23, 2016 (KR) .................. 10-2016-0178394

(51) Int. Cl.
*G06F 1/20* (2006.01)
*H02J 50/10* (2016.01)
(Continued)

(52) U.S. Cl.
CPC .............. *G06F 1/206* (2013.01); *G06F 1/203* (2013.01); *G06F 1/266* (2013.01); *G06F 1/3212* (2013.01);
(Continued)

(58) Field of Classification Search
CPC ..... G05D 23/1932; G06F 1/203; H01F 5/003; A61B 5/04085; H02J 17/00; H02J 7/0073
See application file for complete search history.

(56) References Cited

U.S. PATENT DOCUMENTS 6,286,109 B1 9/2001 Pirdy
7,520,669 B2 4/2009 Yazawa et al.
(Continued)

FOREIGN PATENT DOCUMENTS

EP 1 762 924 A1 3/2007
EP 2 020 630 A2 2/2009

OTHER PUBLICATIONS

European Search Report dated May 4, 2018.

*Primary Examiner* — Jason Lin
(74) *Attorney, Agent, or Firm* — Cha & Reiter, LLC.

(57) ABSTRACT

An electronic device according to an embodiment includes a battery supplying power to the electronic device, at least one circuit board having one or more components disposed thereon, a first temperature sensor disposed in a first region of the circuit board that is adjacent to one of the one or more components, a second temperature sensor disposed in a second region away from the first region, and a processor configured to measure a first temperature corresponding to the first region using the first temperature sensor, measure a second temperature corresponding to the second region or the outside of the electronic device using the second temperature sensor, determine a third temperature for the battery based at least on the first and second temperatures, and control the use of a resource of the electronic device when the third temperature satisfies a specified condition. Other various embodiments are also possible.

19 Claims, 11 Drawing Sheets

(51) Int. Cl.
*G06F 1/26* (2006.01)
*G06F 1/3212* (2019.01)
*G06F 1/3287* (2019.01)
*H02J 7/00* (2006.01)
*H02J 7/02* (2016.01)

(52) U.S. Cl.
CPC .......... *G06F 1/3287* (2013.01); *H02J 7/0091* (2013.01); *H02J 7/025* (2013.01); *H02J 50/10* (2016.02)

(56) References Cited

U.S. PATENT DOCUMENTS

| | | | |
|---|---|---|---|
| 8,433,938 B2 | 4/2013 | Cha et al. | |
| 8,555,093 B2 | 10/2013 | Song et al. | |
| 8,762,097 B2 | 6/2014 | Millet | |
| 8,768,530 B2 | 7/2014 | Liang et al. | |
| 9,405,352 B2 | 8/2016 | Cha et al. | |
| 10,299,690 B2 * | 5/2019 | Choi | A61B 5/04085 |
| 2008/0028778 A1 | 2/2008 | Millet | |
| 2008/0043807 A1 | 2/2008 | Yazawa et al. | |
| 2008/0278111 A1 * | 11/2008 | Genies | H02J 7/0073 320/101 |
| 2009/0037754 A1 | 2/2009 | Cha et al. | |
| 2009/0299543 A1 * | 12/2009 | Cox | G06F 1/203 700/299 |
| 2011/0050164 A1 * | 3/2011 | Partovi | H01F 5/003 320/108 |
| 2011/0283132 A1 | 11/2011 | Song et al. | |
| 2011/0301778 A1 * | 12/2011 | Liang | G05D 23/1932 700/299 |
| 2012/0184338 A1 * | 7/2012 | Kesler | H02J 17/00 455/572 |
| 2013/0227322 A1 | 8/2013 | Cha et al. | |
| 2014/0125277 A1 * | 5/2014 | Van Wiemeersch | H02J 7/025 320/108 |
| 2014/0362889 A1 | 12/2014 | Jang et al. | |

\* cited by examiner

ELECTRONIC DEVICE AND HEAT CONTROL METHOD BASED ON TEMPERATURE OF BATTERY IN ELECTRONIC DEVICE

CLAIM OF PRIORITY

This application claims the benefit under 35 U.S.C. § 119(a) of a Korean patent application filed on Dec. 23, 2016 in the Korean Intellectual Property Office and assigned Serial number 10-2016-0178394, the entire disclosure of which is hereby incorporated by reference.

TECHNICAL FIELD

Embodiments of the present disclosure described herein generally relate to technology for controlling heat generated from an electronic device.

BACKGROUND

In recent years, various types of portable electronic devices, such as smartphones, tablet PCs, and the like, have been widely used. These portable electronic devices may include batteries and may be operated using power supplied from the batteries. For example, a portable electronic device may include a lithium ion battery. The battery of the portable electronic device may generate heat when supplying power to other elements of the portable electronic device. The amount of heat generated from the battery may increase with an increase in the amount of power supplied to the other elements of the portable electronic device.

SUMMARY

A portable electronic device in the art may control heat generated from the portable electronic device by first determining the temperature of the processor in the portable electronic device or the surface temperature of the portable electronic device. However, since modern portable electronic devices have include diverse elements, heat may be generated by elements other than the processor. Therefore, it may be difficult to determine the overall temperature of the portable electronic device by using only the temperature of the processor or the surface temperature of the portable electronic device. Furthermore, due to space limitations within the portable electronic device, it may be difficult to measure the temperature of the battery in the portable electronic device.

Aspects of the present disclosure are to address at least the above-mentioned problems and/or disadvantages and to provide at least the advantages described below. Accordingly, an aspect of the present disclosure is to provide a device and method for measuring the temperature of a battery and a method of controlling an electronic device based on the measured temperature.

In accordance with an aspect of the present disclosure, an electronic device includes a battery configured to supply power to the electronic device, at least one circuit board on which one or more components are disposed, a first temperature sensor disposed in a first region of the circuit board that is adjacent to a component in the one or more components, a second temperature sensor disposed in a second region away from the first region, and a processor. The processor is configured to measure a first temperature corresponding to the first region by using the first temperature sensor, measure a second temperature corresponding to the second region or the outside of the electronic device by using the second temperature sensor, determine a third temperature for the battery based at least on the first temperature and the second temperature, and control the use of a resource of the electronic device in a case where the third temperature satisfies a specified condition.

In accordance with another aspect of the present disclosure, an electronic device includes a battery for supplying power to the electronic device, a first temperature sensor and a second temperature sensor for measuring temperature, and a processor. The processor is configured to measure a first temperature corresponding to the processor by using the first temperature sensor, measure a second temperature corresponding to the outside of the electronic device by using the second temperature sensor, determine contextual information relating to the battery based on the first temperature and the second temperature, operate the battery and the processor based on a first specified function in the case where the contextual information satisfies a first specified condition, and operate the battery and the processor based on a second specified function in the case where the contextual information satisfies a second specified condition.

In accordance with another aspect of the present disclosure, an electronic device includes a camera, a speaker, a display, a battery, a printed circuit board, a charging integrated circuit (IC) disposed on the printed circuit board to supply power to the battery, a communication circuit disposed on the printed circuit board to wirelessly communicate with an external device, a processor disposed on the printed circuit board and electrically connected to the camera, the speaker, the display, the battery, the charging IC, and the communication circuit, and a plurality of temperature sensors disposed in regions adjacent to two or more of the camera, the speaker, the charging IC, the communication circuit, and the processor. The processor is configured to obtain temperature data by using the plurality of temperature sensors, compute a parameter relating to the temperature of the battery based on the temperature data, and restrict a function or performance of at least one of the camera, the speaker, the display, the charging IC, the communication circuit, and the processor to lower the temperature of the battery if the parameter is within a specified range.

According to embodiments of the present disclosure described herein, by computing a parameter relating to the temperature of the battery based on temperature data measured at a plurality of points, it is possible to effectively control heat generated from the battery or components of the electronic device.

In addition, the present disclosure may provide various other advantages that are expressly disclosed herein or are readily apparent to one of skill in the art.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
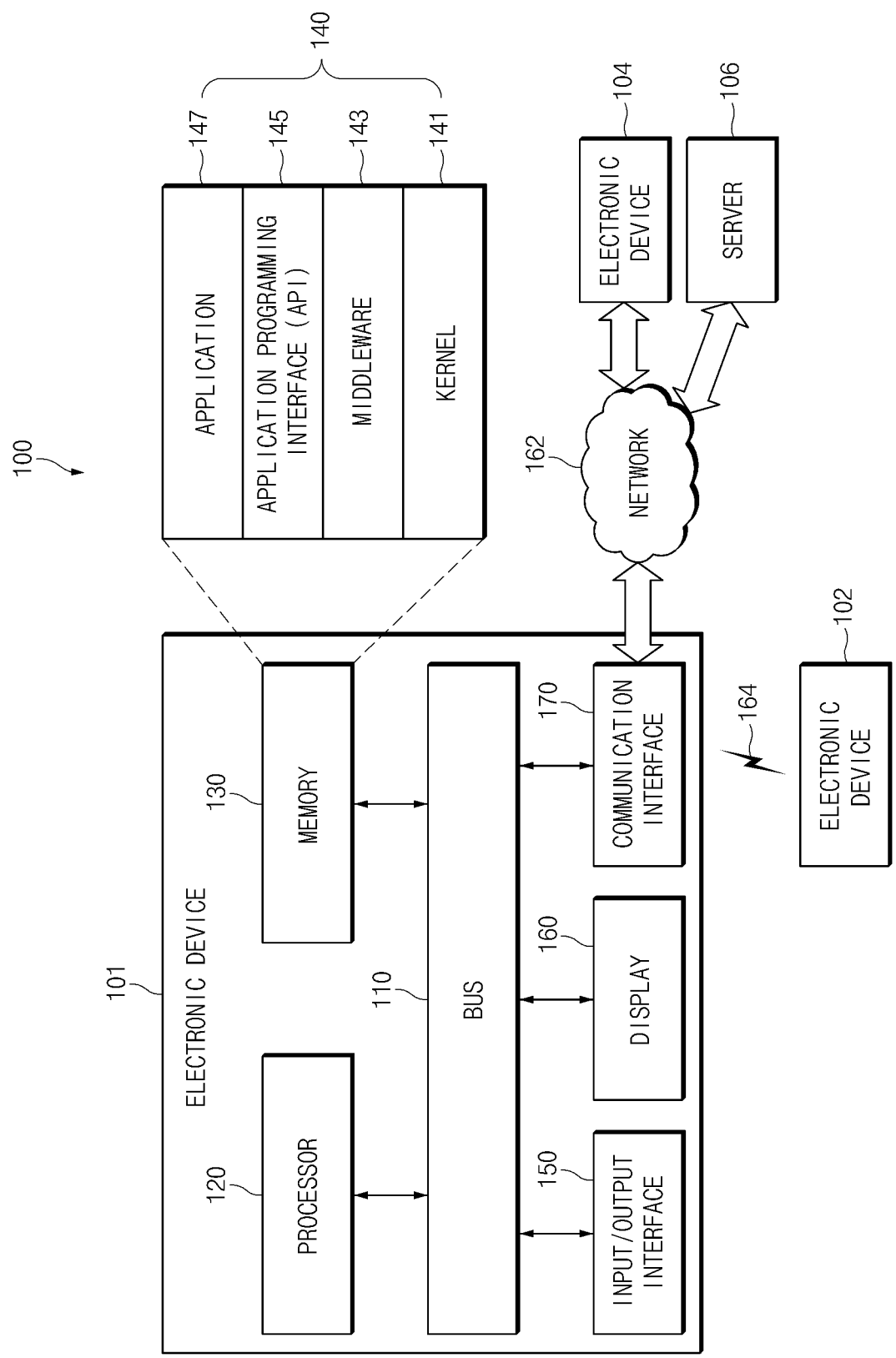
FIG. 1 illustrates an electronic device in a network environment according to one embodiment.

Hereinafter, various embodiments of the present disclosure may be described with reference to accompanying drawings. Accordingly, those of ordinary skill in the art will recognize that modifications, equivalents, and/or alternatives of the various embodiments described herein can be made without departing from the scope and spirit of the present disclosure. The terms in singular form may also refer to the plural, unless otherwise specified. In this disclosure, the expressions "A or B," "at least one of A or/and B," or "one or more of A or/and B," and the like may include any and all combinations of one or more of the associated listed items. The terms, such as "first," "second," and the like may be used to refer to various elements regardless of the order and/or the priority and to distinguish the relevant elements from other elements, but do not limit the elements. When an element (e.g., a first element) is referred to as being "(operatively or communicatively) coupled with/to" or "connected to" another element (e.g., a second element), the element may be directly coupled with/to or connected to the other element or an intervening element (e.g., a third element) may be present.

According to the situation, the expression "configured to" used in this disclosure may be used as, for example, the expression "suitable for," "having the capacity to," "adapted to," "made to," "capable of," or "designed to" in hardware or software. The expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Electronic devices according to various embodiments of the present disclosure may be smartphones, tablet personal computers (PCs), mobile phones, video telephones, e-book read ers, desktop PCs, laptop PCs, netbook computers, workstations, servers, personal digital assistants (PDAs), portable multimedia players (PMPs), Motion Picture Experts Group (MPEG-1 or MPE G-2) Audio Layer 3 (MP3) players, mobile medical devices, cameras, wearable devices (e.g., head-mounted-devices (HMDs), such as electronic glasses), electronic apparel, electronic bracelets, electronic necklaces, electronic appcessories, electronic tattoos, smart watches, and the like. According to another embodiment, the electronic devices may be home appliances, such as televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, or the like.

According to another embodiment, the electronic devices may be medical devices (e.g., various portable medical measurement devices, such as blood glucose monitoring devices, heartbeat measuring devices, blood pressure measuring devices, body temperature measuring devices, etc., magnetic resonance angiography (MRA) devices, magnetic resonance imaging (MRI) devices, computed tomography (CT) devices, medical scanners, and ultrasonic devices), navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales devices (POSs), or IoT (Internet of Things) devices (e.g., light bulbs, sensors, electric or gas meters, sprinkler devices, fire alarms, thermostats, street lamps, toasters, exercise equipment, hot water tanks, heaters, boilers, and the like). According to another embodiment, the electronic devices may be parts of furniture or buildings/structures, electronic boards, electronic signature receiving devices, projectors, or various measuring instruments (e.g., water meters, electricity meters, gas meters, or wave meters, and the like). In the various embodiments, the electronic device may be one of the above-described devices or a combination thereof. An electronic device according to an embodiment may be a flexible device. Furthermore, an electronic device according to an embodiment may not be limited to the above-described electronic devices and may include other electronic devices developed in the art. In this disclosure, the term "user" may refer to a person who uses an electronic device or may refer to a device (e.g., an artificial intelligence electronic device) that uses the electronic device.

Referring to FIG. 1, according to one embodiment, an electronic device 101 in a network environment is described. The electronic device 101 may include a bus 110, a processor 120, a memory 130, an input/output interface 150, a display 160, and a communication interface 170. According to an embodiment, the electronic device 101 may not include at least one of the above-described elements or may further include other element(s). The bus 110 may interconnect the above-described elements 110 to 170 and may include a circuit for conveying communications (e.g., a control message and/or data) among the above-described elements. The processor 120 may include one or more of a central processing unit (CPU), an application processor (AP), or a communication processor (CP). For example, the processor 120 may perform an arithmetic operation or data processing associated with control and/or communication of at least other elements of the electronic device 101.

The memory 130 may include a volatile and/or nonvolatile memory. For example, the memory 130 may store instructions or data associated with at least one other element(s) of the electronic device 101. According to an embodiment, the memory 130 may store software and/or a program 140. The program 140 may include, for example, a kernel 141, a middleware 143, an application programming interface (API) 145, and/or an application program (or "an application") 147. At least a part of the kernel 141, the middleware 143, or the API 145 may be referred to as an "operating system (OS)". For example, the kernel 141 may control or manage system resources (e.g., the bus 110, the processor 120, the memory 130, and the like) that are used to execute operations or functions of other programs (e.g., the middleware 143, the API 145, and the application program 147). Furthermore, the kernel 141 may provide an interface that allows the middleware 143, the API 145, or the application program 147 to access discrete elements of the electronic device 101 so as to control or manage system resources.

The middleware 143 may perform, for example, a mediation role such that the API 145 or the application program 147 communicates with the kernel 141 to exchange data. Furthermore, the middleware 143 may process one or more task requests received from the application program 147 according to a priority. For example, the middleware 143 may assign the priority, which makes it possible to use a system resource (e.g., the bus 110, the processor 120, the memory 130, or the like) of the electronic device 101, to at least one of the application program 147 and may process the one or more task requests. The API 145 may be an interface through which the application program 147 controls a function provided by the kernel 141 or the middleware 143, and may include, for example, at least one interface or function (e.g., an instruction) for a file control, a window control, image processing, a character control, or the like. The input/output interface 150 may transmit an instruction or data input from a user or another external device, to other element(s) of the electronic device 101 or may output an instruction or data, received from other element(s) of the electronic device 101, to a user or another external device.

The display 160 may include, for example, a liquid crystal display (LCD), a light-emitting diode (LED) display, an organic LED (OLED) display, a microelectromechanical systems (MEMS) display, or an electronic paper display. The display 160 may display, for example, various contents (e.g., a text, an image, a video, an icon, a symbol, and the like) to a user. The display 160 may include a touch screen and may receive, for example, a touch, gesture, proximity, or hovering input using an electronic pen or a part of a user's body. For example, the communication interface 170 may establish communication between the electronic device 101 and an external device (e.g., the first electronic device 102, the second electronic device 104, or the server 106). For example, the communication interface 170 may be connected to the network 162 over wireless communication or wired communication to communicate with the external device (e.g., the second electronic device 104 or the server 106).

For example, the wireless communication may include cellular communication using at least one of long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like. As exemplified by an element 164 in FIG. 1, the wireless communication may include at least one of wireless fidelity (Wi-Fi), light fidelity (LiFi), Bluetooth, Bluetooth low energy (BLE), Zigbee, near field communication (NFC), magnetic stripe transmission (MST), radio frequency (RF), a body area network, or the like. According to an embodiment, the wireless communication may include GNSS. The GNSS may be one of, for example, a global positioning system (GPS), a global navigation satellite system (Glonass), a Beidou navigation satellite system (hereinafter referred to as "Beidou"), or an European global satellite-based navigation system (hereinafter referred to as "Galileo"). Hereinafter, in this disclosure, "GPS" and "GNSS" may be interchangeably used. The wired communication may include at least one of, for example, a universal serial bus (USB), a high definition multimedia interface (HDMI), a recommended standard-232 (RS-232), power line communication, a plain old telephone service (POTS), or the like. The network 162 may include at least one of telecommunications networks, for example, a computer network (e.g., LAN or WAN), an Internet, or a telephone network.

Each of the first and second electronic devices 102 and 104 may be a device of which the type is different from or the same as that of the electronic device 101. According to various embodiments, all or a portion of operations that the electronic device 101 will perform may be executed by another or plural electronic devices (e.g., the first electronic device 102, the second electronic device 104 or the server 106). According to an embodiment, in the case where the electronic device 101 executes any function or service automatically or in response to a request, the electronic device 101 may not perform the function or the service internally, but, alternatively additionally, it may request at least a portion of a function associated with the electronic device 101 at other electronic device (e.g., the electronic device 102 or 104 or the server 106). The other electronic device (e.g., the electronic device 102 or 104 or the server 106) may execute the requested function or additional function and may transmit the execution result to the electronic device 101. The electronic device 101 may provide the requested function or service using the received result or may additionally process the received result to provide the requested function or service. To this end, for example, cloud computing, distributed computing, or client-server computing may be used.

Figure 2:
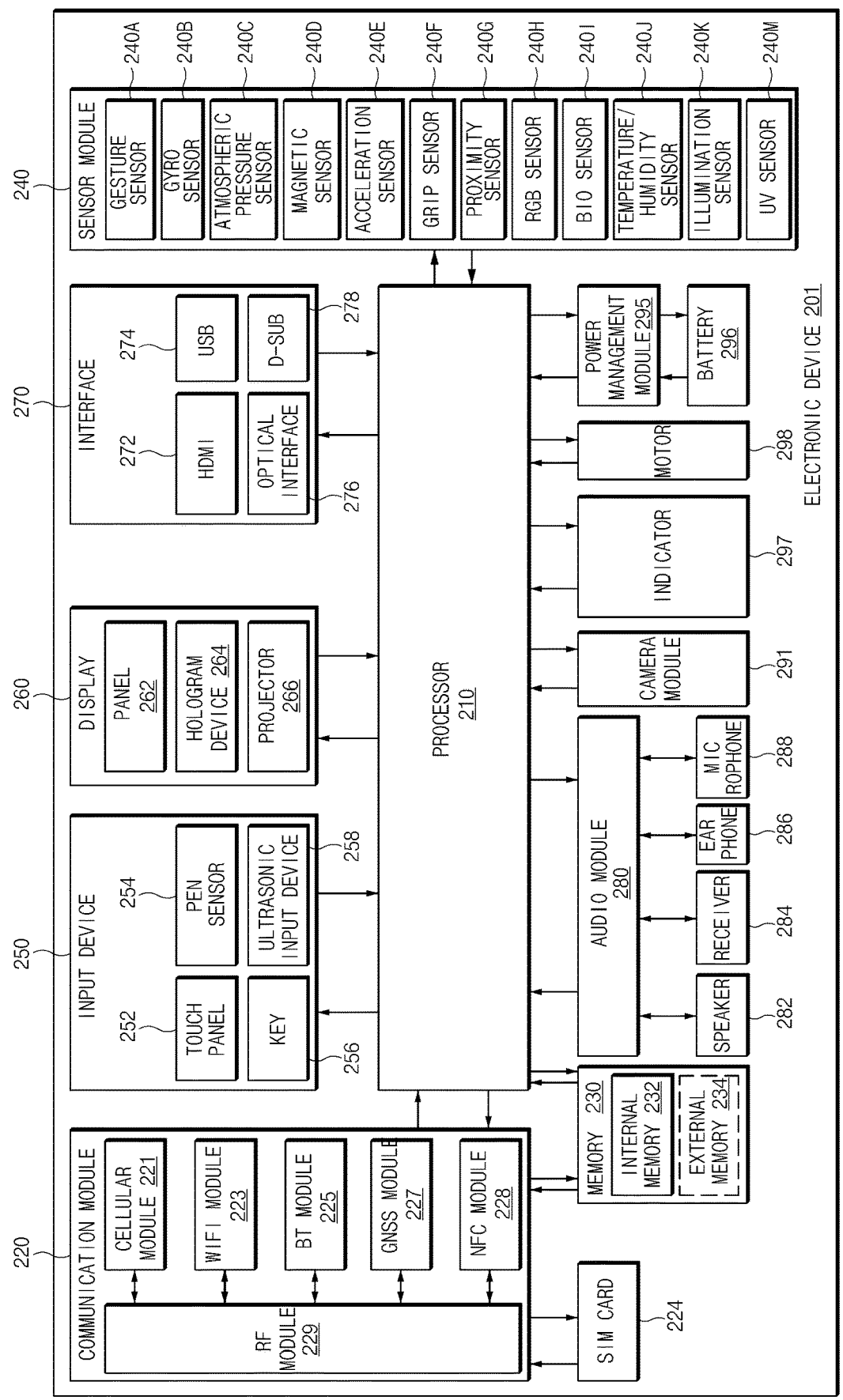
FIG. 2 is a block diagram of an electronic device according to one embodiment.

FIG. 2 illustrates a block diagram of an electronic device, according to one embodiment. An electronic device 201 may include, for example, all or a part of the electronic device 101 illustrated in FIG. 1. The electronic device 201 may include one or more processors (e.g., an application processor (AP)) 210, a communication module 220, a subscriber identification module 224, a memory 230, a sensor module 240, an input device 250, a display 260, an interface 270, an audio module 280, a camera module 291, a power management module 295, a battery 296, an indicator 297, and a motor 298. For example, the processor 210 may be implemented with a System on Chip (SoC). According to an embodiment, the processor 210 may further include a graphic processing unit (GPU) and/or an image signal processor. The processor 210 may include at least a part (e.g., a cellular module 221) of elements illustrated in FIG. 2. The processor 210 may load an instruction or data, which is received from at least one of other elements (e.g., a nonvolatile memory), into a volatile memory and process the loaded instruction or data. The processor 210 may store result data in the nonvolatile memory.

The communication module 220 may be configured the same as or similar to the communication interface 170 of FIG. 1. The communication module 220 may include the cellular module 221, a Wi-Fi module 223, a Bluetooth (BT) module 225, a GNSS module 227, a near field communication (NFC) module 228, and a radio frequency (RF) module 229. The cellular module 221 may provide, for example, voice communication, video communication, a character service, an Internet service, or the like over a communication network. According to an embodiment, the cellular module 221 may perform discrimination and authentication of the electronic device 201 within a communication network by using the subscriber identification module (e.g., a SIM card) 224. According to an embodiment, the cellular module 221 may perform at least a portion of functions that the processor 210 provides. According to an embodiment, the cellular module 221 may include a communication processor (CP). According to an embodiment, at least a part (e.g., two or more) of the cellular module 221, the Wi-Fi module 223, the BT module 225, the GNSS module 227, or the NFC module 228 may be included within one Integrated Circuit (IC) or an IC package. For example, the RF module 229 may transmit and receive a communication signal (e.g., an RF signal). For example, the RF module 229 may include a transceiver, a power amplifier module (PAM), a frequency filter, a low noise amplifier (LNA), an antenna, or the like. According to another embodiment, at least one of the cellular module 221, the Wi-Fi module 223, the BT module 225, the GNSS module 227, or the NFC module 228 may transmit and receive an RF signal through a separate RF module. The subscriber identification module 224 may include, for example, a card and/or embedded SIM that includes a subscriber identification module and may include unique identify information (e.g., integrated circuit card identifier (ICCID)) or subscriber information (e.g., international mobile subscriber identity (IMSI)).

The memory 230 (e.g., the memory 130) may include an internal memory 232 or an external memory 234. For example, the internal memory 232 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory, a hard drive, or a solid state drive (SSD). The external memory 234 may include a flash drive such as compact flash (CF), secure digital (SD), micro secure digital (Micro-SD), mini secure digital (Mini-SD), extreme digital (xD), a multimedia card (MMC), a memory stick, or the like. The external memory 234 may be operatively and/or physically connected to the electronic device 201 through various interfaces.

The sensor module 240 may measure, for example, a physical quantity or may detect an operation state of the electronic device 201. The sensor module 240 may convert the measured or detected information to an electric signal. For example, the sensor module 240 may include at least one of a gesture sensor 240A, a gyro sensor 240B, a barometric pressure sensor 240C, a magnetic sensor 240D, an acceleration sensor 240E, a grip sensor 240F, the proximity sensor 240G, a color sensor 240H (e.g., red, green, blue (RGB) sensor), a biometric sensor 240I, a temperature/humidity sensor 240J, an illuminance sensor 240K, or an UV sensor 240M. Although not illustrated, additionally or generally, the sensor module 240 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling at least one or more sensors included therein. According to an embodiment, the electronic device 201 may further include a processor that is a part of the processor 210 or independent of the processor 210 and is configured to control the sensor module 240. The processor may control the sensor module 240 while the processor 210 remains at a sleep state.

The input device 250 may include, for example, a touch panel 252, a (digital) pen sensor 254, a key 256, or an ultrasonic input unit 258. For example, the touch panel 252 may use at least one of capacitive, resistive, infrared and ultrasonic detecting methods. Also, the touch panel 252 may further include a control circuit. The touch panel 252 may further include a tactile layer to provide a tactile reaction to a user. The (digital) pen sensor 254 may be, for example, a part of a touch panel or may include an additional sheet for recognition. The key 256 may include, for example, a physical button, an optical key, or a keypad. The ultrasonic input device 258 may detect (or sense) an ultrasonic signal, which is generated from an input device, through a microphone (e.g., a microphone 288) and may check data corresponding to the detected ultrasonic signal.

The display 260 (e.g., the display 160) may include a panel 262, a hologram device 264, a projector 266, and/or a control circuit for controlling the panel 262, the hologram device 264, or the projector 266. The panel 262 may be implemented, for example, to be flexible, transparent or wearable. The panel 262 and the touch panel 252 may be integrated into a single module. According to an embodiment, the panel 262 may include a pressure sensor (or force sensor) that measures the intensity of touch pressure by a user. The pressure sensor may be implemented integrally with the touch panel 252, or may be implemented as at least one sensor separately from the touch panel 252. The hologram device 264 may display a stereoscopic image in a space using a light interference phenomenon. The projector 266 may project light onto a screen so as to display an image. For example, the screen may be arranged in the inside or the outside of the electronic device 201. The interface 270 may include, for example, a high-definition multimedia interface (HDMI) 272, a universal serial bus (USB) 274, an optical interface 276, or a D-subminiature (D-sub) 278. The interface 270 may be included, for example, in the communication interface 170 illustrated in FIG. 1. Additionally or generally, the interface 270 may include, for example, a mobile high definition link (MHL) interface, a SD card/multi-media card (MMC) interface, or an infrared data association (IrDA) standard interface.

The audio module 280 may convert a sound and an electric signal in dual directions. At least a part of the audio module 280 may be included, for example, in the input/output interface 150 illustrated in FIG. 1. The audio module 280 may process, for example, sound information that is input or output through a speaker 282, a receiver 284, an earphone 286, or the microphone 288. For example, the camera module 291 may shoot a still image or a video. According to an embodiment, the camera module 291 may include at least one or more image sensors (e.g., a front sensor or a rear sensor), a lens, an image signal processor (ISP), or a flash (e.g., an LED or a xenon lamp). The power management module 295 may manage, for example, power of the electronic device 201. According to an embodiment, a power management integrated circuit (PMIC), a charger IC, or a battery or fuel gauge may be included in the power management module 295. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, a rectifier, or the like. The battery gauge may measure, for example, a remaining capacity of the battery 296 and a voltage, current or temperature thereof while the battery is charged. The battery 296 may include, for example, a rechargeable battery and/or a solar battery.

The indicator 297 may display a specific state of the electronic device 201 or a part thereof (e.g., the processor 210), such as a booting state, a message state, a charging state, and the like. The motor 298 may convert an electrical signal into a mechanical vibration and may generate the following effects: vibration, haptic, and the like. The electronic device 201 may include a processing device (e.g., a GPU) for supporting a mobile TV. The processing device for supporting the mobile TV may process media data according to the standards of digital multimedia broadcasting (DMB), digital video broadcasting (DVB), MediaFLO™, or the like. Each of the above-mentioned elements of the electronic device according to various embodiments of the present disclosure may be configured with one or more components, and the names of the elements may be changed according to the type of the electronic device. In various embodiments, some elements of the electronic device (e.g., the electronic device 201) may be omitted or other additional elements may be added. Furthermore, some of the elements of the electronic device may be combined with each other so as to form one entity, so that the functions of the elements may be performed in the same manner as before the combination.

Figure 3:
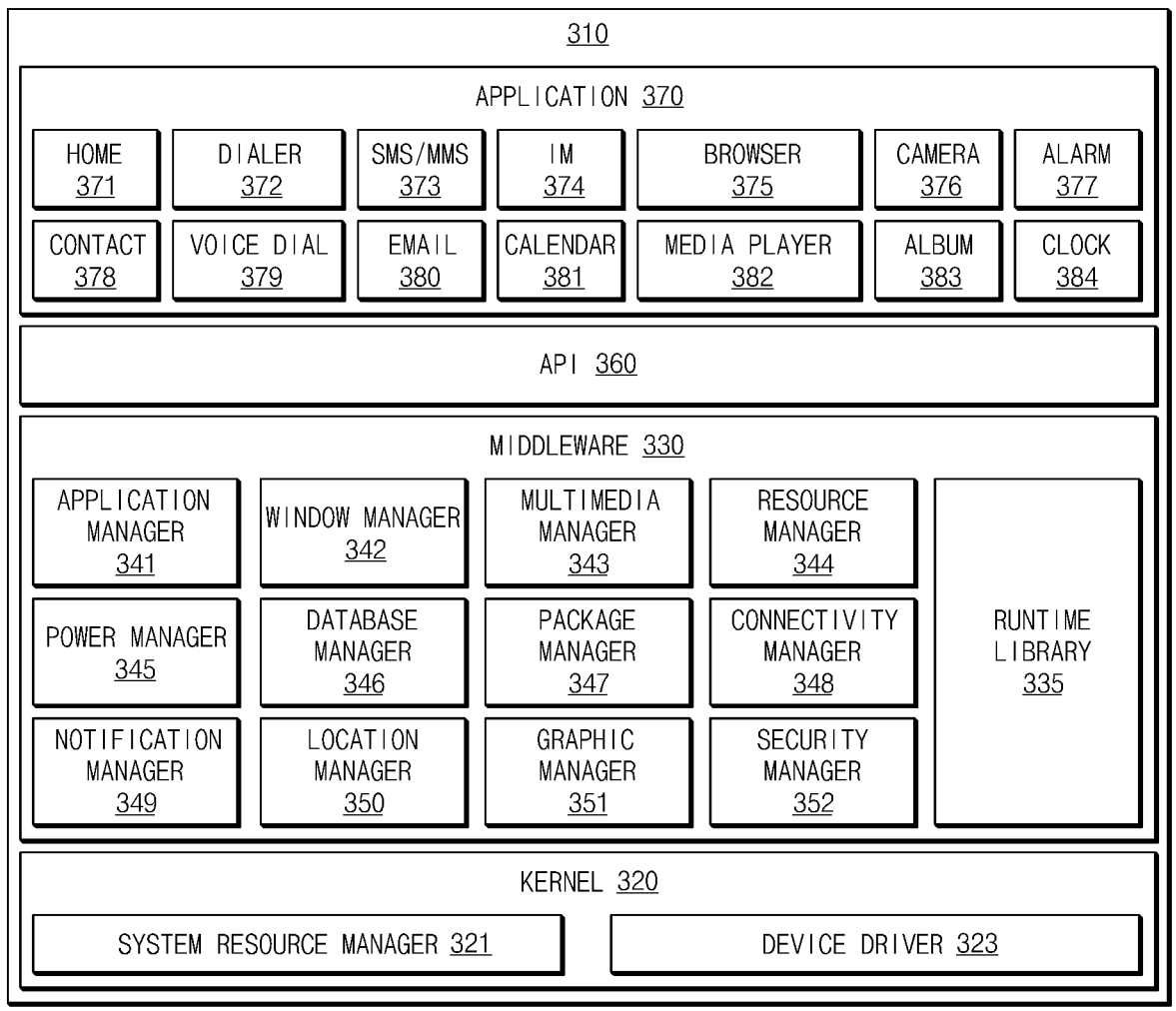
FIG. 3 is a block diagram of a program module according to one embodiment.

FIG. 3 illustrates a block diagram of a program module, according to one embodiment. According to an embodiment, a program module 310 (e.g., the program 140) may include an operating system (OS) to control resources associated with an electronic device (e.g., the electronic device 101), and/or diverse applications (e.g., the application program 147) driven on the OS. The OS may be, for example, Android™, iOS™, Windows™, Symbian™, Tizen™, or Bada™. The program module 310 may include a kernel 320 (e.g., the kernel 141), a middleware 330 (e.g., the middleware 143), an application programming interface (API) 360 (e.g., the API 145), and/or an application 370 (e.g., the application program 147). At least a portion of the program module 310 may be preloaded on an electronic device or may be downloadable from an external electronic device (e.g., the first electronic device 102, the second electronic device 104, the server 106, or the like).

The kernel 320 (e.g., the kernel 141) may include, for example, a system resource manager 321 or a device driver 323. The system resource manager 321 may control, allocate, or retrieve system resources. According to an embodiment, the system resource manager 321 may include a process managing unit, a memory managing unit, a file system managing unit, or the like. The device driver 323 may include, for example, a display driver, a camera driver, a Bluetooth driver, a shared memory driver, a USB driver, a keypad driver, a Wi-Fi driver, an audio driver, or an inter-process communication (IPC) driver. The middleware 330 may provide, for example, a function that the application 370 needs in common, or may provide diverse functions to the application 370 through the API 360 to allow the application 370 to efficiently use limited system resources of the electronic device. According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include, for example, a library module that is used by a compiler to add a new function through a programming language while the application 370 is being executed. The runtime library 335 may perform input/output management, memory management, or capacities about arithmetic functions. The application manager 341 may manage, for example, a life cycle of at least one application of the application 370. The window manager 342 may manage a graphic user interface (GUI) resource that is used in a screen. The multimedia manager 343 may identify a format necessary for playing diverse media files, and may perform encoding or decoding of media files by using a codec suitable for the format. The resource manager 344 may manage resources such as a memory space or source code of the application 370. The power manager 345 may manage a battery, a temperature, or power, and may determine or provide power information for an operation of an electronic device by using the corresponding information. According to an embodiment, the power manager 345 may operate with a basic input/output system (BIOS). The database manager 346 may generate, search for, or modify database that is to be used in the application 370. The package manager 347 may install or update an application that is distributed in the form of package file.

The connectivity manager 348 may manage, for example, wireless connection. The notification manager 349 may provide an event, for example, arrival message, appointment, or proximity notification to a user. For example, the location manager 350 may manage location information about an electronic device. The graphic manager 351 may manage a graphic effect that is provided to a user, or manage a user interface relevant thereto. The security manager 352 may provide, for example, system security or user authentication. According to an embodiment, the middleware 330 may include a telephony manager for managing a voice or video call function of the electronic device or a middleware module that combines diverse functions of the above-described elements. According to an embodiment, the middleware 330 may provide a module specialized to each OS kind to provide differentiated functions. Additionally, the middleware 330 may dynamically remove a part of the preexisting elements or may add new elements thereto. The API 360 may be, for example, a set of programming functions and may be provided with a configuration that is variable depending on an OS. For example, in the case where an OS is the android or the iOS, it may provide one API set per platform. In the case where an OS is the tizen, it may provide two or more API sets per platform.

The application 370 may include, for example, applications such as a home 371, a dialer 372, an SMS/MMS 373, an instant message (IM) 374, a browser 375, a camera 376, an alarm 377, a contact 378, a voice dial 379, an e-mail 380, a calendar 381, a media player 382, an album 383, a watch 384, health care (e.g., measuring an exercise quantity, blood sugar, or the like) or offering of environment information (e.g., information of barometric pressure, humidity, temperature, or the like). According to an embodiment, the application 370 may include an information exchanging application to support information exchange between an electronic device and an external electronic device. The information exchanging application may include, for example, a notification relay application for transmitting specific information to an external electronic device, or a device management application for managing the external electronic device. For example, the notification relay application may include a function of transmitting notification information, which arise from other applications, to an external electronic device or may receive, for example, notification information from an external electronic device and provide the notification information to a user. The device management application may install, delete, or update for example, a function (e.g., turn-on/turn-off of an external electronic device itself (or a part of components) or adjustment of brightness (or resolution) of a display) of the external electronic device which communicates with the electronic device, and an application running in the external electronic device. According to an embodiment, the application 370 may include an application (e.g., a health care application of a mobile medical device) that is assigned in accordance with an attribute of an external electronic device. According to an embodiment, the application 370 may include an application that is received from an external electronic device. At least a portion of the program module 310 may be implemented by software, firmware, hardware (e.g., the processor 210), or a combination (e.g., execution) of two or more thereof, and may include modules, programs, routines, sets of instructions, processes, or the like for performing one or more functions.

Figure 4:
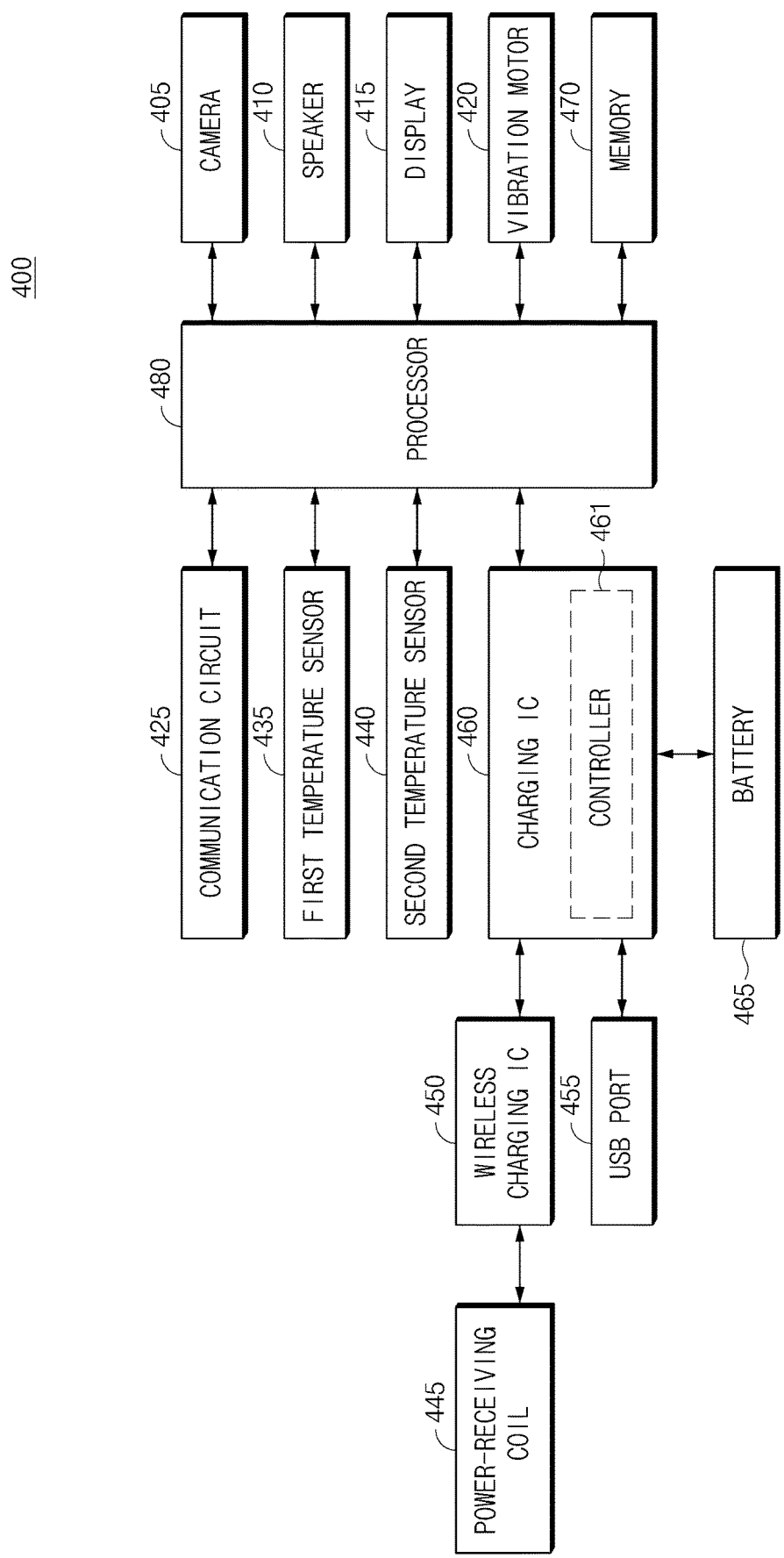
FIG. 4 is a block diagram illustrating a configuration of an electronic device according to an embodiment.

FIG. 4 is a block diagram illustrating a configuration of an electronic device according to an embodiment.

Referring to FIG. 4, an electronic device 400 according to an embodiment may include a camera 405, a speaker 410, a display 415, a vibration motor 420, a communication circuit 425, a first temperature sensor 435, a second temperature sensor 440, a power-receiving coil 445, a wireless charging IC 450, a USB port 455, a charging IC 460, a battery 465, a memory 470, and a processor 480. For example, the electronic device 400 may be one of various devices, such as a smartphone, a tablet PC, a wearable device, and the like. The electronic device 400 may be referred to as a mobile device, a mobile terminal, user equipment (UE), or the like.

The camera 405 may capture images. With improvements in the performance of the camera 405 (e.g., improvements in resolution, frame rate, and the like or inclusion of additional components such as a dual camera), the camera 405 may consume a larger amount of power, and the heat generated from the camera 405 may increase.

The speaker 410 may output sound. For example, the speaker 410 may provide sound notifications to the user.

The display 415 may output text and/or images. For example, the display 415 may provide visual notification messages to the user.

The vibration motor 420 may output vibration signals. For example, the vibration motor 420 may provide vibration notification or feedback to the user.

The communication circuit 425 may wirelessly communicate with external devices. The communication circuit 425 may include a cellular module (e.g., the cellular module 221 of FIG. 2), a Wi-Fi module (e.g., the Wi-Fi module 223 of FIG. 2), or the like. With the development of wireless communication technologies, the throughput of the communication circuit 425 may increase, and heat generated by the communication circuit 425 may increase. The communication circuit 425 may include, for example, a power amplifier module (PAM), and the PAM of the communication circuit 425 may generate heat more than other parts of the communication circuit 425.

According to an embodiment, the processor 480, the communication circuit 425, the charging IC 460, the camera 405, the display 415, and the memory 470 (including the software stored in the memory 470) may be collectively referred to as the resources or system resources of the electronic device 400. Operations to control the resources may include the operation of changing the execution speed, the execution clock, and/or the clock frequency of the processor 480 of the electronic device 400, the operation of changing the brightness, the luminance, and/or the color of the display 415, the operation of controlling the photographing resolution or the flash operation of the camera 405, the operation of controlling the wired or wireless charging of the charging IC 460, the operation of controlling the volume of the speaker 410, and/or the operation of controlling the throughput of the communication circuit 425. The electronic device 400 may lower the temperature of the battery 465 by controlling the system resources via these operations.

The plurality of temperature sensors 435 and 440 may be individually disposed in regions adjacent to two or more of the elements within the electronic device 400 such as the camera 405, the speaker 410, the communication circuit 425, the power-receiving coil 445, the charging IC 460, and the processor 480. One of the plurality of temperature sensors 435 and 440 may be disposed in the region adjacent to the camera 405, the speaker 410, the communication circuit 425, the power-receiving coil 445, the charging IC 460, or the processor 480, and the other temperature sensor may be disposed on a sub-PCB (e.g., the sub-PCB 595 of FIG. 5). Each of the plurality of temperature sensors 435 and 440 may be, for example, a thermistor. In FIG. 4, the electronic device 400 is illustrated as including the two temperature sensors 435 and 440. Without being limited thereto, however, the electronic device 400 may include three or more temperature sensors.

According to an embodiment, the first temperature sensor 435 may be disposed in the region in the vicinity of the battery 465.

The second temperature sensor 440 may be disposed in the region away from other components of the electronic device 400 (i.e. away from the camera 405, the speaker 410, the communication circuit 425, the power-receiving coil 445, the charging IC 460, the processor 480, and the like). For example, the second temperature sensor 440 may be disposed on the sub-PCB (e.g., the sub-PCB 595 of FIG. 5). The second temperature sensor 440 may be disposed at a specified distance or more apart from regions where components are disposed on the sub-PCB.

The power-receiving coil 445 may be configured to wirelessly receive power from an external component such as an external wireless charger. For example, the power-receiving coil 445 may be a coil capable of generating an induced current depending on changes in an external magnetic field.

The wireless charging IC 450 may be electrically connected with the power-receiving coil 445. The wireless charging IC 450 may rectify an AC current generated in the power-receiving coil 445 to a DC current.

The USB port 455 may be configured to accommodate a USB connector. The USB port 455 may be connected with the sub-PCB (e.g., the sub-PCB 595 of FIG. 5).

The charging IC 460 may be electrically connected with the power-receiving coil 445 and the USB port 455. The charging IC 460 may be electrically connected with the power-receiving coil 445 through the wireless charging IC 450. The charging IC 460 may supply power to the battery 465. Although not illustrated in FIG. 4, the charging IC 460 may be electrically connected with other elements of the electronic device 400 and may supply power to the other elements of the electronic device 400. The charging IC 460 herein may be referred to as a PMIC or a charger.

The battery 465 may supply power to the electronic device 400. Although not illustrated in FIG. 4, this may be done when the battery 465 is electrically connected with other elements of the electronic device 400 and supplies power to the other elements of the electronic device 400.

The battery 465 may be charged by power supplied from the charging IC 460. The memory 470 may store data. For example, the memory 470 may store first temperature data and second temperature data obtained by the first temperature sensor 435 and the second temperature sensor 440. The memory 470 may also store a parameter (or third temperature data or contextual information) computed based on the first temperature data and the second temperature data.

The processor 480 may be electrically connected with the camera 405, the speaker 410, the display 415, the vibration motor 420, the communication circuit 425, the plurality of temperature sensors 435 and 440, the power-receiving coil 445, the wireless charging IC 450, the USB port 455, the charging IC 460, the battery 465, and the memory 470. The processor 480 may control the camera 405, the speaker 410, the display 415, the vibration motor 420, the communication circuit 425, the plurality of temperature sensors 435 and 440, the power-receiving coil 445, the wireless charging IC 450, the USB port 455, the charging IC 460, the battery 465, and the memory 470. The processor 480 may include one or more of a central processing unit, an application processor, and a communication processor. The processor 480 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

According to an embodiment, the processor 480 may obtain temperature data by using the plurality of temperature sensors. For example, the processor 480 may obtain the first temperature data by using the first temperature sensor 435 and the second temperature data by using the second temperature sensor 440. The processor 480 may periodically poll the temperature sensors to obtain temperature data, even while the processor 480 is in a low-power state. The processor 480 may use different methods to obtain the plurality of temperature data depending on the state (normal mode, low-power mode, or the like) of the processor 480. For example, when the processor 480 operates in normal mode, the processor 480 may more frequently monitor temperature than when the processor 480 operates in low-power mode. In particular, the processor 480 may monitor temperature six times per minute in normal mode and two times per minute in low-power mode. However, when the processor 480 operates in low-power mode but the electronic device 400 is being charged, the processor 480 may monitor temperature more frequently or just as frequently as compared to the normal mode. The processor 480 may shorten the monitoring period (i.e. monitor the temperature more frequently) as the third temperature approaches a specified reference. For example, in the case where the specified reference is 45° C., the processor 480 may monitor temperature six times per minute when the third temperature is lower than or equal to 40° C. and seven times or more per minute when the third temperature is higher than or equal to 40° C. In the low-power mode, the processor 480 may deactivate most its blocks so that they are in their sleep states and may activate only the blocks needed for monitoring the temperature sensors and determining the third temperature.

Using the first temperature sensor 435 disposed in the region adjacent to the one or more components, the processor 480 may measure a first temperature associated with heat generated from the one or more components. For example, the processor 480 may measure the first temperature corresponding to the processor 480 by using the first temperature sensor 435 disposed in a region adjacent to the processor 480.

The processor 480 may measure a second temperature by using the second temperature sensor 440 disposed in a region away from the one or more components of the electronic device 400. For example, the processor 480 may measure the second temperature corresponding to the outside of the electronic device 400 by using the second temperature sensor 440.

The processor 480 may compute a parameter relating to the temperature of the battery 465 based on temperature data. For example, the processor 480 may compute the mean of the temperature data as the parameter relating to the temperature of the battery 465. In another example, the processor 480 may multiply the mean of the temperature data by a specified coefficient to compute the parameter relating to the temperature of the battery 465. In another example, the processor 480 may apply different weighting values to the temperature data, respectively, to compute the parameter relating to the temperature of the battery 465. In this disclosure, the parameter relating to the temperature of the battery 465 may be referred to as a third temperature for the battery 465, contextual information relating to the battery 465, or the like.

The processor 480 may charge the battery 465 with a specified magnitude of current when the difference between the first temperature measured by using the first temperature sensor 435 and the second temperature measured by using the second temperature sensor 440 satisfies a specified condition. The processor 480 may charge the battery 465 with a different specified magnitude of current when the difference between the first temperature and the second temperature does not satisfy the specified condition.

If the parameter relating to the temperature of the battery 465 is within a specified range, the processor 480 may restrict the function or performance of the camera 405, the speaker 410, the display 415, the communication circuit 425, the power-receiving coil 445, the charging IC 460, and/or the processor 480. For example, if the parameter is higher than a specified value, the processor 480 may determine that the temperature of the battery 465 has increased, and may restrict the functions or performance of at least some of the elements of the electronic device 400 to lower the temperature of the battery 465.

In another example, if the parameter is within the specified range, the processor 480 may turn off the electronic device 400 to lower the temperature of the battery 465. In doing so, the processor 480 may forcibly turn off the electronic device 400 (i.e. without user input), or may output a message prompting the user to turn off the electronic device 400.

In another example, if the parameter is within the specified range while the battery 465 is being charged, the processor 480 may adjust the charging voltage or the charging current to lower the temperature of the battery 465. For example, if the battery 465 is charged via the USB port 455, the processor 480 may decrease the charging rate from about 1 C (charging rate) to about 0.8 C, or may further decrease the charging rate to about 0.72 C. On the other hand, if the battery 465 is being charged wirelessly, the processor 480 may decrease the quantity of electric charge to be charged when the temperature of the battery 465 is between 10° C. to 40° C. to about 0.45 C. The processor may also decrease the quantity of electric charge to be charged when the temperature of the battery 465 is between 0° C. to 10° C. or 41° C. to 50° C. to about 0.3 C. In another example, when the battery 465 is being charged wirelessly, the processor 480 may continue to lower the temperature of the battery 465 even when the state of charge (SOC) of the battery 465 is lower than or equal to 5%.

According to an embodiment, when the battery 465 is being charged, the processor 480 may control the charging IC 460 to charge the battery 465 if the parameter relating to the battery 465 is within a rechargeable temperature range (e.g., about 0° C. to about 50° C.). The processor 480 may control the charging IC 460 to stop charging the battery 465 if the parameter relating to the battery 465 is beyond the rechargeable temperature range. When the battery 465 is being charged, the processor 480 may decrease the charging current if the parameter relating to the battery 465 is higher than a swelling prevention temperature (about 41° C.). The swelling prevention temperature may be the temperature above which swelling in the battery 465 may occur. The rechargeable temperature range and the swelling prevention temperature for wireless charging may be different those for charging via USB.

In another example, if the parameter is within the specified range while the battery 465 is being discharged, the processor 480 may adjust the brightness of the display 415, the operating frequency of the processor 480, and/or functions of the executing application to lower the temperature of the battery 465. For example, the processor 480 may adjust the brightness of the display 415 to be lower. The processor 480 may also lower the clock frequency or operating voltage of the processor 480. In addition, the processor 480 may restrict various functions of executing applications such as the telephone call application, the short message service (SMS) application, the contacts application, etc.

The processor 480 may output a notification by using the speaker 410, the display 415, and/or the vibration motor 420 if the parameter is within the specified range. For example, the processor 480 may output a notification sound by using the speaker 410, output a notification vibration by using the vibration motor 420, and display a notification message on the display 415. Illustrative notification messages will be described below in detail with reference to FIGS. 7 and 8.

After placing certain restrictions on the functions of the electronic device 400 due to the parameter being in the specified range, the processor 480 may remove restrictions if the parameter later is detected to be outside the specified range.

The processor 480 may operate the battery 465 and the processor 480 based on a first specified function when the parameter satisfies a first specified condition, and may operate the battery 465 and the processor 480 based on a second specified function when the parameter satisfies a second specified condition.

The processor 480 may control the use of the resources of the electronic device 400 when the third temperature satisfies a specified condition. For example, if the third temperature is within a specified range (e.g., 45° C. or more) or approaches a specified value (e.g., 43° C.), the processor 480 may control the use of the resources of the electronic device 400. In another example, if the third temperature is within the specified range for a specified period of time (e.g., 10 seconds) or more, the processor 480 may control the use of the resource of the electronic device 400. When determining whether the specified condition is satisfied, the processor 480 may take into account the number of times the battery 465 has been charged and/or the type of application (e.g., telephone call application, camera application, media playback application, etc.) currently running in the electronic device 400. The priority of the running application may be set as the emergency call application first, the telephone call application second, camera application third, foreground application fourth, and background application fifth. If an application of higher priority is executing, the processor 480 may impose fewer restrictions on the resources of the electronic device 400.

An example of the use of the resource controlled by the processor 480 is as follows. According to an embodiment, if a specified condition is satisfied while the battery 465 is being discharged, the processor 480 may adjust the clock frequency of the processor 480, the brightness of the display 415, or the like. On the other hand, if the specified condition is satisfied while the battery 465 is being charged by using the charging IC 460, the processor 480 may adjust the voltage or current for charging the battery 465. The processor 480 may adjust the voltage or current for charging the battery 465 based on the difference between the third temperature and the first or second temperature. The processor 480 may turn off the electronic device 400 if the third temperature satisfies another specified condition. The processor 480 may turn on the electronic device 400 again if the third temperature satisfies yet another specified condition after the electronic device 400 is turned off. In another example, the processor 480 may end or temporarily stop at least one application running in the electronic device 400 if the third temperature satisfies the specified condition.

As disclosed above, if the parameter is within the specified range, the processor 480 may control the executing application running in the electronic device 400 to lower the temperature of the battery 465. For example, the processor 480 may stop or suspend the application or may adjust the execution speed of the application.

As disclosed above, when the third temperature is within the specified range while the battery 465 is being charged, the processor 480 may adjust the charging voltage, the charging current, the swelling prevention temperature, and/or the rechargeable temperature range for the battery 465.

The processor 480 may output information relating to the third temperature by using an output device. The processor 480 may provide another piece of information relating to the adjustment operation by using an output device.

For example, the processor 480 may output a message relating to the third temperature on the display 415. The processor 480 may output the message relating to the third temperature on the display 415 and then turn off the electronic device 400. Afterwards, if the third temperature falls out of the specified range, the processor 480 may turn on the electronic device 400 and then output another message relating to the third temperature. For example, the processor 480 may turn off the electronic device 400 in the case where the third temperature is higher than or equal to 60° C., and may turn on the electronic device 400 again if the third temperature decreases to 40° C. or lower. Illustrative messages will be described below in detail with reference to FIGS. 7 and 8.

The charging IC 460 may include a controller 461 embedded in the charging IC 460. The operations described as being performed by the processor 480 may be performed by the controller 461 in an alternative embodiment.

Figure 5:
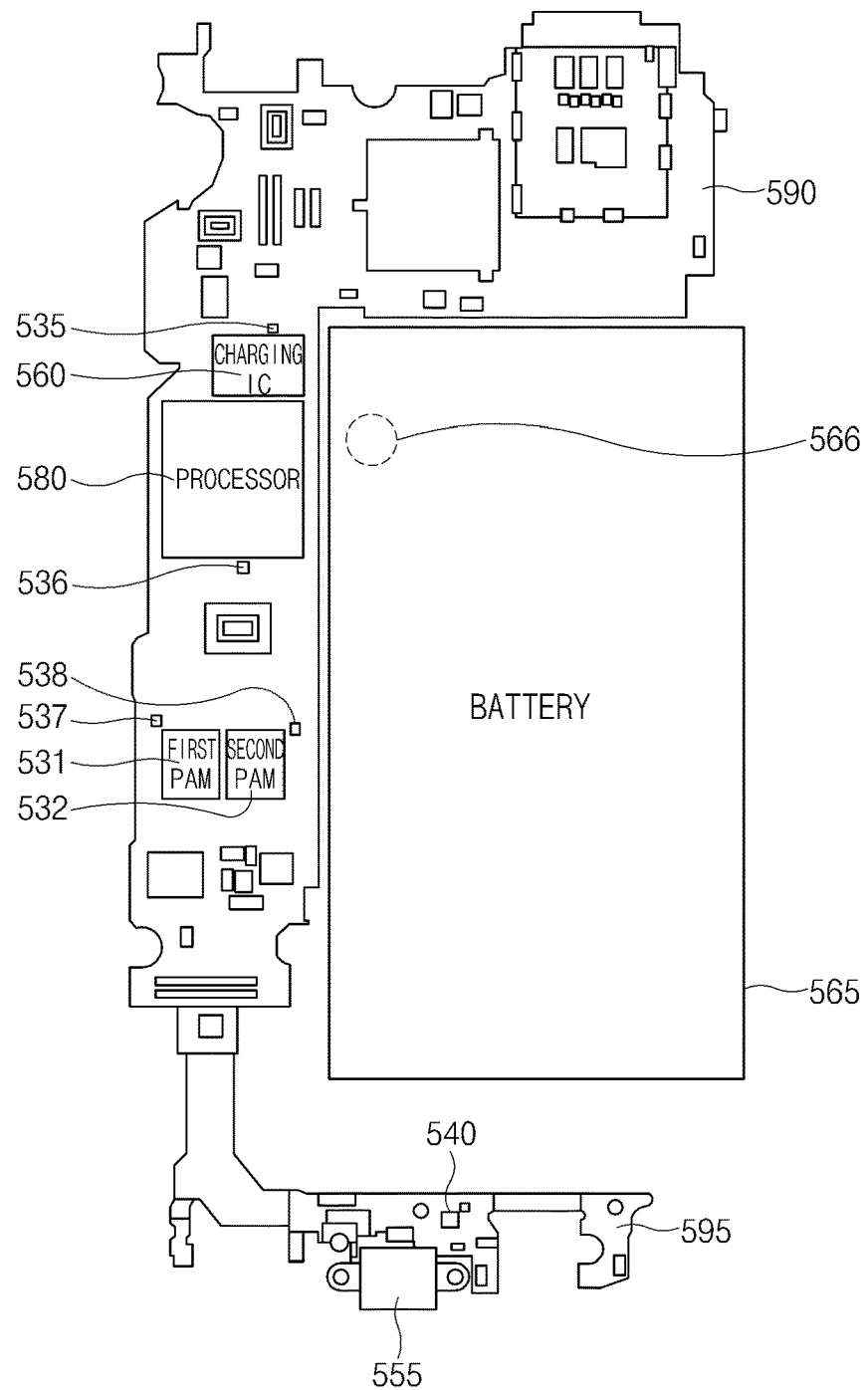
FIG. 5 illustrates an exemplary arrangement of elements of an electronic device according to an embodiment.

FIG. 5 illustrates an exemplary arrangement of elements of an electronic device according to an embodiment.

Referring to FIG. 5, an electronic device 500 according to an embodiment may include a first PAM 531, a second PAM 532, a USB port 555, a charging IC 560, a battery 565, a processor 580, a main printed circuit board (PCB) 590, a sub-PCB 595, and a plurality of temperature sensors 535, 536, 537, 538, and 540.

The first PAM 531, the second PAM 532, the charging IC 560, the processor 580, the first temperature sensor 535, the second temperature sensor 536, the third temperature sensor 537, and the fourth temperature sensor 538 may be disposed on the main PCB 590. The sub-PCB 595 may be electrically connected with the main PCB 590. The fifth temperature sensor 540 may be disposed on the sub-PCB 595. The battery 565 may be surrounded by the main PCB 590.

The first temperature sensor 535 may be disposed in a region adjacent to the charging IC 560. For example, the first temperature sensor 535 may be disposed above the charging IC 560 on the main PCB 590. Accordingly, the first temperature sensor 535 may sense the temperature change in the charging IC 560. The second temperature sensor 536 may be disposed in a region adjacent to the processor 580. For example, the second temperature sensor 536 may be disposed below the processor 580 on the main PCB 590. Accordingly, the second temperature sensor 536 may sense the temperature change in the processor 580. The third temperature sensor 537 may be disposed in a region adjacent to the first PAM 531. For example, the third temperature sensor 537 may be disposed above the first PAM 531 on the main PCB 590. Accordingly, the third temperature sensor 537 may sense the temperature change in the first PAM 531. The fourth temperature sensor 538 may be disposed in a region adjacent to the second PAM 532. For example, the fourth temperature sensor 538 may be disposed above the second PAM 532 on the main PCB 590. Accordingly, the fourth temperature sensor 538 may sense the temperature change in the second PAM 532.

The fifth temperature sensor 540 may be disposed on the sub-PCB 595. For example, the fifth temperature sensor 540 may be disposed in a region away from components 531-580 of the electronic device 500 that are disposed on the PCB 590. The fifth temperature sensor 540 may indirectly sense the temperature outside the electronic device 500. The electronic device 500 may use temperature data sensed by the fifth temperature sensor 540 to compute a parameter relating to the temperature of the battery 565. Therefore, the parameter takes into account the temperature outside the electronic device 500.

An electronic device according to an embodiment may compute the parameter relating to the temperature of the battery by using temperature data measured by a plurality of temperature sensors (e.g., two or more of the first to fifth temperature sensors 535 to 538 and 540 of FIG. 5). The parameter relating to the temperature of the battery may correlate to the temperature of the highest-temperature region 566 on the surface of the battery or an average temperature of the surface of the battery. An illustrative equation for computing the parameter $T_{batt}$ relating to the temperature of the battery is as follows:

$$T_{batt} = \alpha \times Avg(T_{SubPCB}, T_{CHG}) \quad \text{[Equation 1]}$$

Where $T_{SubPCB}$ is temperature data sensed by a temperature sensor (e.g., the fifth temperature sensor 540) disposed on a sub-PCB, $T_{CHG}$ is temperature data sensed by a temperature sensor (e.g., the first temperature sensor 535) disposed in a region adjacent to a charging IC, and α is a predetermined coefficient. α may be varied depending on the model of an electronic device. α may also vary depending on whether the electronic device is being charged using the USB port, wirelessly charging, or discharging. Table 1 below lists illustrative a values.

TABLE 1

|  | 1st Electronic Device | 2nd Electronic Device | 3rd Electronic Device | 4th Electronic Device |
|---|---|---|---|---|
| Wired Charging | 0.91 | 0.91 | 0.95 | 0.91 |
| Discharging & Wireless Charging | 0.95 | 0.97 | 1.0 | 0.98 |

Table 2 lists differences (unit: ° C.) between parameters $T_{batt}$ and the actual temperatures of batteries according to various embodiments.

TABLE 2

|  | 1st Electronic Device | 2nd Electronic Device | 3rd Electronic Device | 4th Electronic Device |
|---|---|---|---|---|
| Room-Temperature Charging | +1.2 | +1.0 | +0.7 | +1.5 |
| High-Temperature Charging | −1.5 | −1.2 | −0.6 | −0.3 |
| Room-Temperature Discharging | −1.0 | −0.3 | −0.8 | −1.5 |
| High-Temperature Discharging | +0.1 | +0.1 | −0.1 | +1.0 |

As listed in Table 2, each electronic device may compute a parameter $T_{batt}$ close to the actual temperature of the batteries. The actual measured temperature of the battery may be the temperature of the highest-temperature region (e.g., the region 566) on the surface of the battery.

Figure 6:
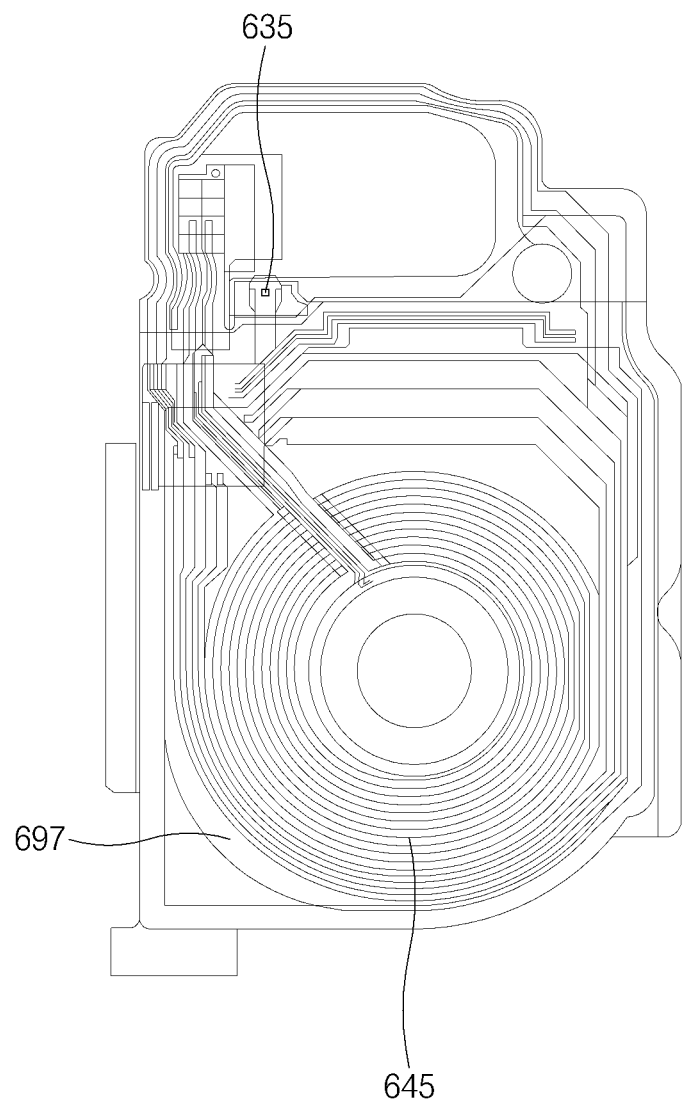
FIG. 6 illustrates a power-receiving coil included in an electronic device according to an embodiment.

FIG. 6 illustrates a power-receiving coil included in an electronic device according to an embodiment.

Referring to FIG. 6, an electronic device according to an embodiment may include a power-receiving coil 645 and a temperature sensor 635. The power-receiving coil 645 may be configured to wirelessly receive power from an external charger. The power-receiving coil 645 may be configured to generate a current depending on changes in an external magnetic field. The power-receiving coil 645 may be disposed on a flexible printed circuit board (FPCB) 697. The temperature sensor 635 may be disposed in a region adjacent to the power-receiving coil 645. For example, the temperature sensor 635 may be disposed above the power-receiving coil 645 on the FPCB 697. The temperature sensor 635 may sense a temperature change of the power-receiving coil 645. The electronic device according to an embodiment may compute a parameter relating to the temperature of a battery by using temperature data sensed by the temperature sensor 635 associated with the power-receiving coil 645.

Figure 7:
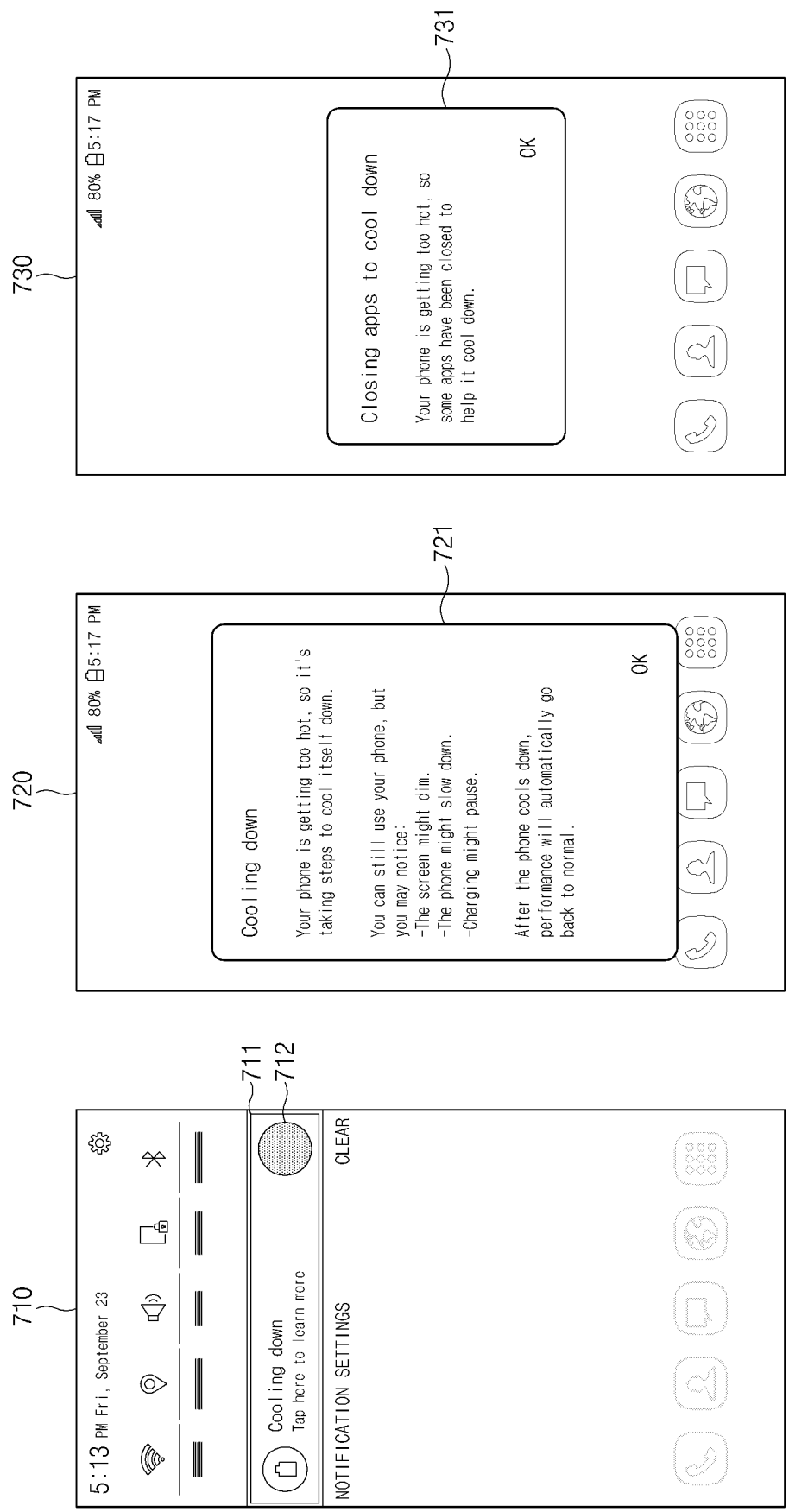
FIG. 7 illustrates an exemplary user interface displayed on an electronic device according to an embodiment.

FIG. 7 illustrates an exemplary user interface displayed on an electronic device according to an embodiment.

It may be understood that operations mentioned as being performed by the electronic device in the description of FIG. 7 are controlled by the processor 480 or the controller 461 of the electronic device 400.

Referring to FIG. 7, the electronic device (e.g., the electronic device 400) according to an embodiment may output a first screen 710, a second screen 720, or a third screen 730 on a display (e.g., the display 415).

According to an embodiment, if the parameter relating to the temperature of the battery of the electronic device 400 is within a specified range, the electronic device may output a notification on the display. For example, the electronic device may output, on the first screen 710, a notification message 711 notifying of execution of operations for cooling the battery down in order to prevent overheating. If a touch input is detected at the region 712 of the notification message 711, the electronic device may output the second screen 720.

As disclosed above, if the parameter relating to the temperature of the battery is within the specified range while the battery is being discharged, the electronic device may adjust the brightness of the display, the operating frequency of the processor, functions of the executing application, etc., to lower the temperature of the battery. The electronic device may output, on the second screen 720, a popup window 721 that includes a message notifying that the brightness of the display, the operating frequency of the processor, and/or functions of the executing application have been adjusted.

Also as explained above, if the parameter relating to the temperature of the battery is within the specified range while the battery is being discharged, the electronic device may stop or suspend at least some running applications to lower the temperature of the battery. The electronic device may output, on the third screen 730, a popup window 731 that includes a message notifying that the some running applications have ended.

Figure 8:
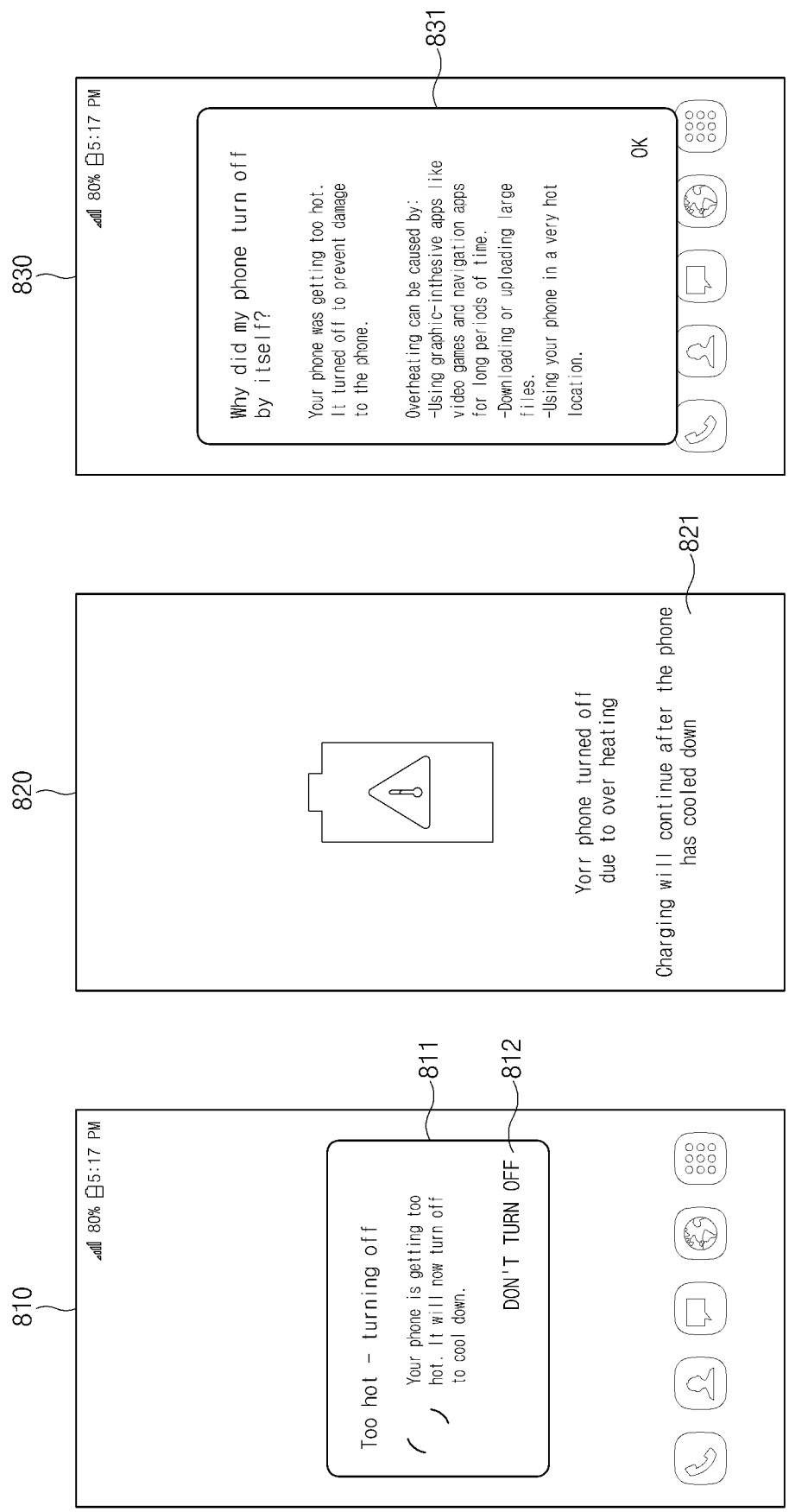
FIG. 8 illustrates an exemplary user interface displayed on an electronic device according to an embodiment.

FIG. 8 illustrates an exemplary user interface displayed on an electronic device according to an embodiment.

It may be understood that operations mentioned as being performed by the electronic device in the description of FIG. 8 are controlled by the processor 480 or the controller 461 of the electronic device 400.

Referring to FIG. 8, the electronic device (e.g., the electronic device 400) according to an embodiment may output a first screen 810, a second screen 820, or a third screen 830 on a display (e.g., the display 415).

According to an embodiment, if the parameter relating to the temperature of the battery is within a specified range, the electronic device may output, on the display, a notification notifying the user that forcible turn-off of the electronic device is about to occur. For example, the electronic device may output, on the first screen 810, a popup window 811 that includes a message informing the user that forcible turn-off of the electronic device is about to occur. The popup window 811 may include a button 812 that allows the user to cancel the forcible turn-off.

If the parameter relating to the temperature of the battery is within the specified range, the electronic device may be forcibly turned off. For example, if a specified period of time passes after the popup window 811 is output, the electronic device may be forcibly turned off. In the case where the battery is being charged when the electronic device is forcibly turned off, the electronic device may display, on the second screen 820, a message 821 informing the user of the forcible turn-off.

If the parameter relating to the temperature of the battery is beyond the specified range, the electronic device may be turned on. For example, the electronic device, after turning on, may display, on the third screen 830, a popup window 831 that includes a message informing the user of the forcible turn-off.

Figure 9:
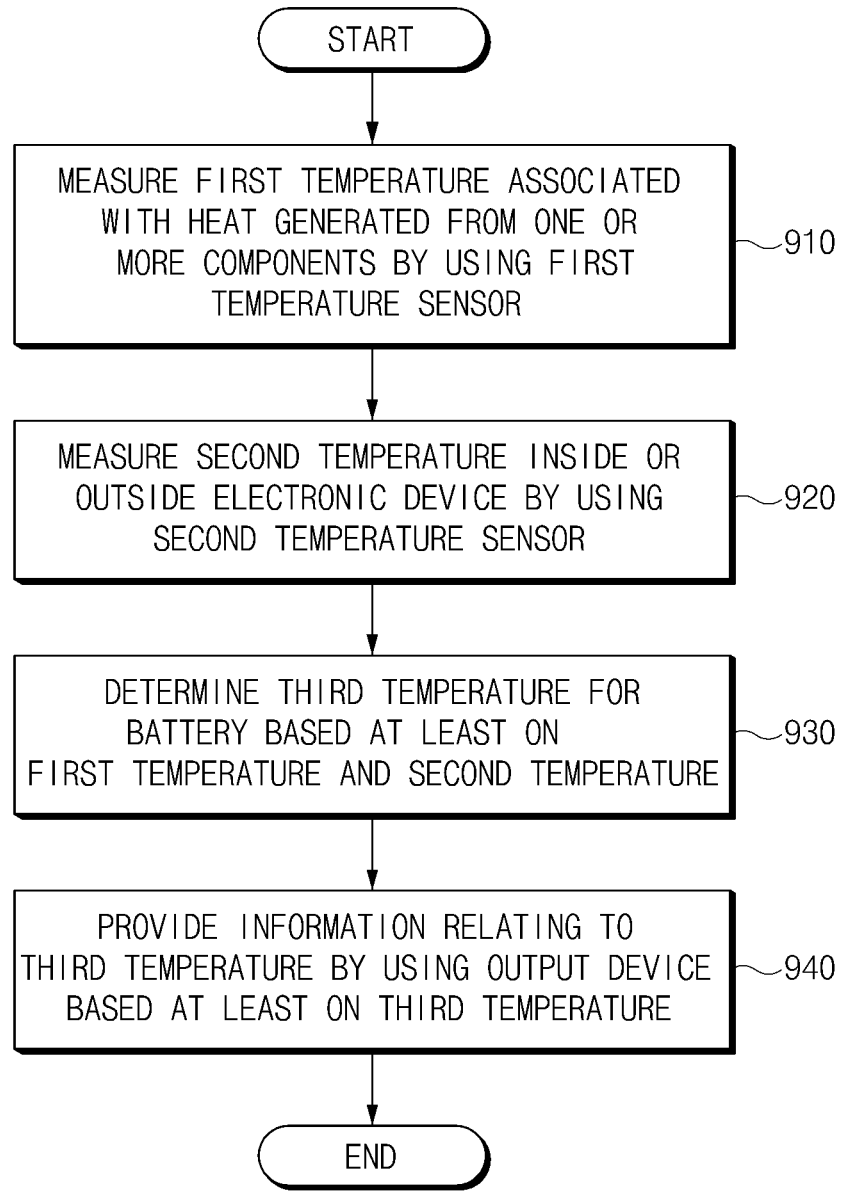
FIG. 9 is a flowchart illustrating a method of controlling heat generated from an electronic device according to an embodiment.

FIG. 9 is a flowchart illustrating a method of controlling heat generated from an electronic device according to an embodiment.

Hereinafter, it is assumed that the electronic device 400 of FIG. 4 performs the process illustrated in FIG. 9. It may be understood that operations mentioned as being performed by the electronic device in the description of FIG. 9 are controlled by the processor 480 or the controller 461 of the electronic device 400.

Referring to FIG. 9, in operation 910, the electronic device (e.g., the processor 480) may measure a first temperature associated with heat generated from one or more components by using a first temperature sensor. For example, the electronic device may measure the first temperature associated with heat generated from a component, such as the camera, the speaker, the communication circuit, the PAM, the power-receiving coil, the charging IC, the processor, or the like, by using the first temperature sensor disposed in a region adjacent to the component.

In operation 920, the electronic device may measure a second temperature inside or outside the electronic device by using a second temperature sensor. For example, the electronic device may measure the second temperature reflecting the temperature inside or outside the electronic device by using the second temperature sensor disposed in a region (e.g., a region of a sub-PCB) away from the regions in which the one or more components are disposed.

In operation 930, the electronic device may determine a third temperature for the battery based on the first temperature and the second temperature. For example, the electronic device may compute the mean of the first temperature and the second temperature as the third temperature. The electronic device may also compute the third temperature by multiplying the mean of the first temperature and the second temperature by a predetermined coefficient. The electronic device may apply different weighting values to the first temperature and the second temperature. According to an embodiment of the present disclosure, the preset coefficient for computation of the third temperature may be varied depending on environmental information (e.g., the position, altitude, or state) of the electronic device or the model of the electronic device.

In operation 940, the electronic device (e.g., the processor 480) may output information relating to the third temperature by using an output device. For example, if the third temperature is higher than a specified value, the electronic device may provide a notification notifying of an increase in the third temperature using for example a speaker, a display, a vibration motor, or the like. According to an embodiment of the present disclosure, the notification may be provided through an external device such as a smartwatch, an HMD, or a server connected with the electronic device. For example, the electronic device may transmit, to the server, the information relating to the third temperature or information relating to the notification. The server may store the received information.

Figure 10:
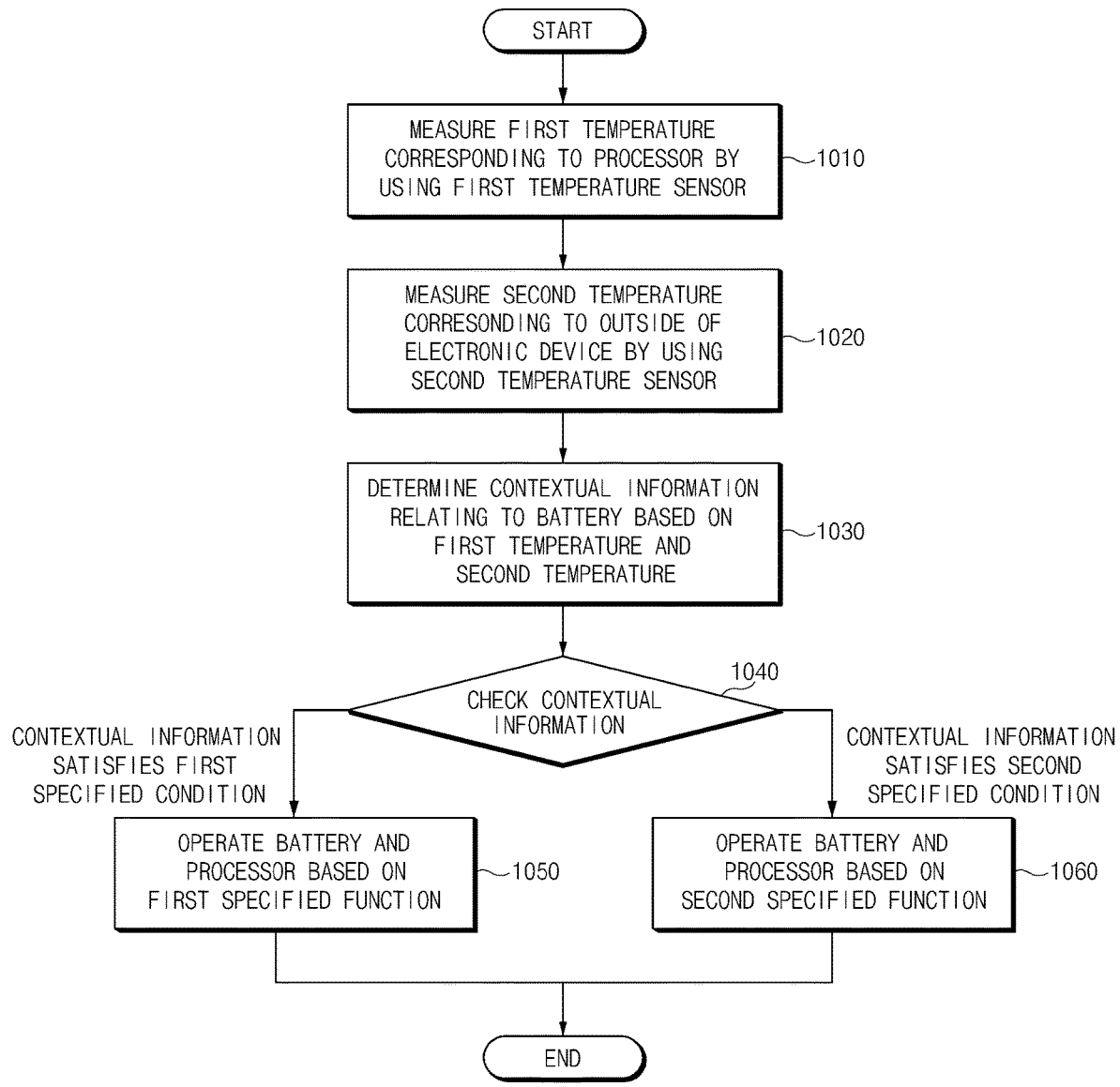
FIG. 10 is a flowchart illustrating a method of controlling heat generated from an electronic device according to an embodiment.

FIG. 10 is a flowchart illustrating a method of controlling heat generated from an electronic device according to an embodiment.

Hereinafter, it is assumed that the electronic device 400 of FIG. 4 performs the process illustrated in FIG. 10. It may be understood that operations mentioned as being performed by the electronic device in the description of FIG. 10 are controlled by the processor 480 or the controller 461 of the electronic device 400.

Referring to FIG. 10, in operation 1010, the electronic device (e.g., the processor 480) may measure a first temperature corresponding to the processor of the electronic device by using a first temperature sensor. For example, the electronic device may measure the first temperature corresponding to the processor by using the first temperature sensor disposed in a region adjacent to the processor.

In operation 1020, the electronic device (e.g., the processor 480) may measure a second temperature corresponding to the outside of the electronic device by using a second temperature sensor. For example, the electronic device may measure the second temperature corresponding to the outside of the electronic device by using the second temperature sensor disposed in a region (e.g., a region of a sub-PCB) away from regions where the processor is disposed.

In operation 1030, the electronic device (e.g., the processor 480) may determine contextual information relating to the battery based on the first temperature and the second temperature. For example, the electronic device may compute the mean of the first temperature and the second temperature to determine the contextual information relating to the battery.

In operation 1040, the electronic device (e.g., the processor 480) may check the contextual information. For example, the electronic device may determine whether the contextual information satisfies a first specified condition or a second specified condition. The first specified condition may refer to, for example, a temperature range lower than a specified temperature. The second specified condition may refer to, for example, a temperature range higher than the specified temperature.

In the case where the contextual information satisfies the first specified condition, the electronic device (e.g., the processor 480) may, in operation 1050, operate the battery and the processor based on a first specified function. For example, the electronic device may normally operate the battery and the processor.

In the case where the contextual information satisfies the second specified condition, the electronic device (e.g., the processor 480) may, in operation 1060, operate the battery and the processor based on a second specified function. For example, the electronic device may restrictive certain operations of the battery and the processor to lower the temperature of the battery.

Figure 11:
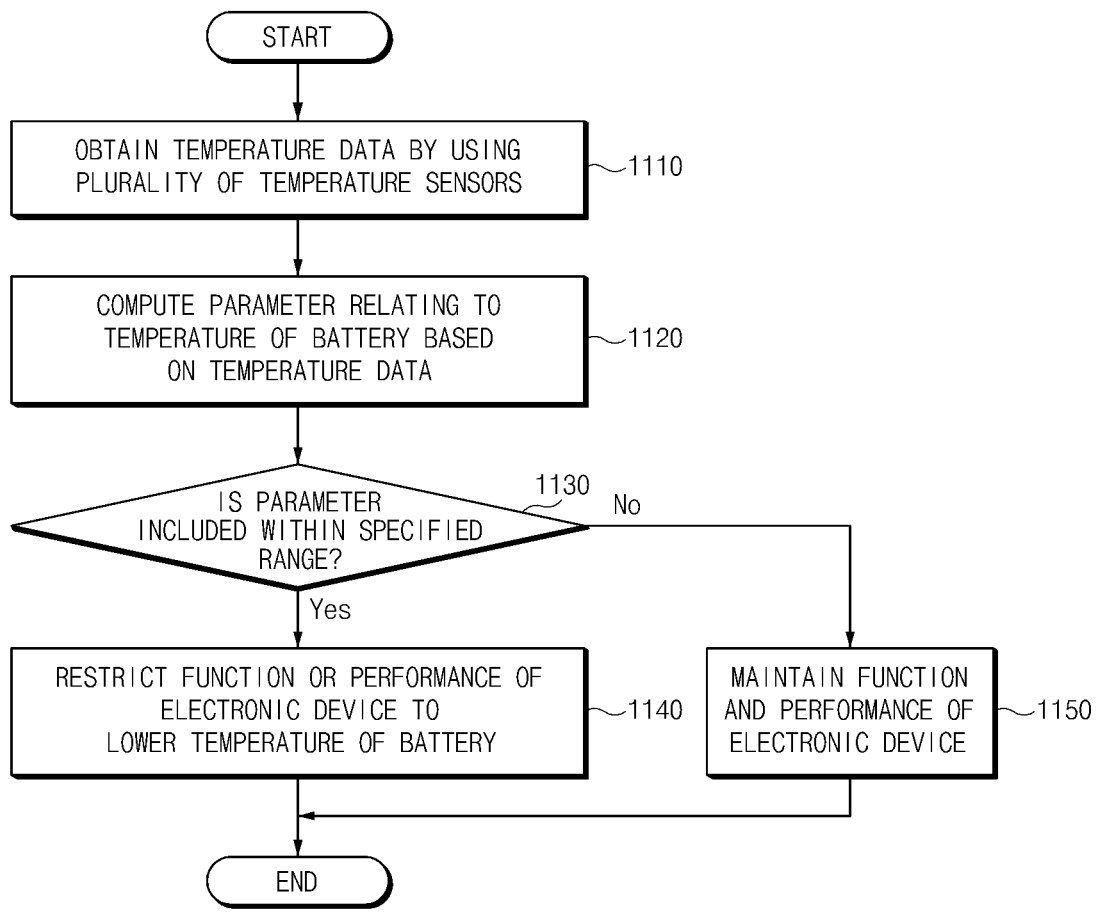
FIG. 11 is a flowchart illustrating a method of controlling heat generated from an electronic device according to an embodiment.

FIG. 11 is a flowchart illustrating a method of controlling heat generated from an electronic device according to an embodiment.

Hereinafter, it is assumed that the electronic device 400 of FIG. 4 performs the process illustrated in FIG. 11. It may be understood that operations mentioned as being performed by the electronic device in the description of FIG. 11 are controlled by the processor 480 or the controller 461 of the electronic device 400.

Referring to FIG. 11, in operation 1110, the electronic device (e.g., the processor 480) may obtain temperature data by using a plurality of temperature sensors. For example, using a plurality of temperature sensors disposed in regions adjacent to various components such as the camera, the speaker, the communication circuit, the PAM, the power-receiving coil, the charging IC, the processor, and/or on a sub-PCB, the electronic device may obtain temperature data associated with the temperatures of the components adjacent to the plurality of temperature sensors and/or the temperature of the outside the electronic device.

In operation 1120, the electronic device (e.g., the processor 480) may compute a parameter relating to the temperature of the battery based on the temperature data. For example, the electronic device may compute the mean of the temperature data. In another example, the electronic device may multiply the mean of the temperature data by a predetermined coefficient. In another example, the electronic device may apply different weighting values to the temperature data.

In operation 1130, the electronic device (e.g., the processor 480) may determine whether the parameter is within a specified range. For example, to determine whether the battery has been overheated, the electronic device may determine whether the parameter is higher than a specified value.

If the parameter is within the specified range, the electronic device (e.g., the processor 480) may, in operation 1140, restrict functions or performance of the electronic device to lower the temperature of the battery. For example, the electronic device may restrict functions executed by some component of the electronic device such as the camera, the speaker, the communication circuit, the PAM, the power-receiving coil, the charging IC, the processor, and the like.

If the parameter is not within the specified range, the electronic device may, in operation 1150, maintain the functions and performance of the electronic device. For example, the electronic device may maintain normal functions and performance of the electronic device.

According to an embodiment, an electronic device may include a battery configured to supply power to the electronic device, at least one circuit board on which one or more components are disposed, a first temperature sensor disposed in a first region of the circuit board that is adjacent to a component in the one or more components, a second temperature sensor disposed in a second region away from the first region, and a processor. The processor may be configured to measure a first temperature corresponding to the first region by using the first temperature sensor, to measure a second temperature corresponding to the second region or the outside of the electronic device by using the second temperature sensor, to determine a third temperature for the battery based at least on the first temperature and the second temperature, and to control the use of a resource of the electronic device in the case where the third temperature satisfies a specified condition.

According to an embodiment, the processor may be configured to adjust the clock frequency of the processor or the brightness of a display included in the electronic device in the case where the specified condition is satisfied while the battery is being discharged, as at least part of the control operation.

According to an embodiment, the electronic device may further include a charging circuit, and the processor may be configured to adjust a voltage or current for charging the battery in the case where the specified condition is satisfied while the battery is being charged by using the charging circuit, as at least part of the control operation.

According to an embodiment, the processor may be configured to adjust a voltage or current for charging the battery based on a difference between the third temperature and the first or second temperature, as at least part of the control operation.

According to an embodiment, the processor may be configured to turn off the electronic device, as at least part of the control operation.

According to an embodiment, the processor may be configured to turn on the electronic device in the case where the third temperature satisfies another specified condition after the electronic device is turned off, as at least part of the control operation.

According to an embodiment, the processor may be configured to stop or suspend at least one application running in the electronic device, as at least part of the control operation.

According to an embodiment, the at least one circuit board may include a first circuit board and a second circuit board. The first temperature sensor may be disposed on the first circuit board, and the second temperature sensor may be disposed on the second circuit board.

According to an embodiment, a coil used for magnetic-field-based short range communication may be formed on the second circuit board.

According to an embodiment, the one or more components may include the processor.

According to an embodiment, the electronic device may further include an output device, and the processor may be configured to provide notification information relating to the third temperature or the control operation by using the output device.

According to an embodiment, the electronic device may further include a communication module, and the processor may be configured to transmit at least part of the notification information to an external electronic device, which is connected with the electronic device through the communication module.

According to an embodiment, an electronic device may include a battery, a first temperature sensor, a second temperature sensor, and a processor. The processor may be configured to measure a first temperature corresponding to a first region inside the electronic device, to measure a second temperature corresponding to a second region inside the electronic device or the outside of the electronic device by using the second temperature sensor, to determine the state of the battery based at least on the first temperature and the second temperature, and to control the use of a resource of the electronic device in the case where the state satisfies a specified condition.

According to an embodiment, the processor may be configured to adjust the clock frequency of the processor or the brightness of a display included in the electronic device in the case where the specified condition is satisfied while the battery is being discharged, as at least part of the control operation.

According to an embodiment, the electronic device may further include a charging circuit, and the processor may be configured to adjust a voltage or current for charging the battery in the case where the specified condition is satisfied while the battery is being charged by using the charging circuit, as at least part of the control operation.

According to an embodiment, the processor may be configured to determine a third temperature corresponding to the battery, and to adjust a voltage or current for charging the battery based on a difference between the third temperature and the first or second temperature, as at least part of the control operation.

According to an embodiment, the processor may be configured to turn off the electronic device, as at least part of the control operation.

According to an embodiment, the processor may be configured to turn on the electronic device in the case where the state satisfies another specified condition after the electronic device is turned off, as at least part of the control operation.

According to an embodiment, the processor may be configured to stop or suspend at least one application running in the electronic device, as at least part of the control operation.

According to an embodiment, the electronic device may further include a first circuit board and a second circuit board. The first temperature sensor may be disposed on the first circuit board, and the second temperature sensor may be disposed on the second circuit board.

According to an embodiment, the processor may be configured to periodically obtain a temperature data by using a plurality of temperature sensors, while the processor is in a low-power or sleep state.

According to an embodiment, a storage medium having instructions stored therein may be provided. The instructions may be configured to allow at least one processor to perform at least one operation when the instructions are executed by the at least one processor, in which the at least one operation may include measuring a first temperature corresponding to a first region inside an electronic device by using a first temperature sensor included in the electronic device, measuring a second temperature corresponding to a second region inside the electronic device or the outside of the electronic device by using a second temperature sensor included in the electronic device, determining the state of a battery included in the electronic device based at least on the first temperature and the second temperature, and controlling the use of a resource of the electronic device in the case where the state satisfies a specified condition.

According to an embodiment, the instructions may be configured to adjust the clock frequency of the processor or the brightness of a display included in the electronic device in the case where the specified condition is satisfied while the battery is being discharged.

According to an embodiment, the instructions may be configured to adjust a voltage or current for charging the battery in the case where the specified condition is satisfied while the battery is being charged by using a charging circuit.

According to an embodiment, an electronic device may include a camera, a speaker, a display, a battery, a printed circuit board, a charging integrated circuit (IC) disposed on the printed circuit board to supply power to the battery, a communication circuit disposed on the printed circuit board to wirelessly communicate with an external device, a processor disposed on the printed circuit board and electrically connected to the camera, the speaker, the display, the battery, the charging IC, and the communication circuit, and a plurality of temperature sensors disposed in regions adjacent to two or more of the camera, the speaker, the charging IC, the communication circuit, and the processor. The processor may be configured to obtain a temperature data by using the plurality of temperature sensors, to compute a parameter relating to the temperature of the battery based on the temperature data, and to restrict a function or performance of at least one of the camera, the speaker, the display, the charging IC, the communication circuit, and the processor to lower the temperature of the battery if the parameter is within a specified range.

According to an embodiment, the electronic device may further include a power-receiving coil configured to wirelessly receive power from an external charger and a USB port configured to accommodate a USB connector. The charging IC may be electrically connected to the power-receiving coil and the USB port. The plurality of temperature sensors may be disposed in regions adjacent to two or more of the camera, the speaker, the charging IC, the communication circuit, the processor, and the power-receiving coil. The processor may be configured to restrict the function or performance of at least one of the camera, the speaker, the display, the charging IC, the communication circuit, the processor, and the power-receiving coil to lower the temperature of the battery if the parameter is within the specified range.

According to an embodiment, the electronic device may further include a sub-printed circuit board electrically connected with the printed circuit board, and the plurality of temperature sensors may be disposed in a region adjacent to one or more of the camera, the speaker, the charging IC, the communication circuit, and the processor, and on the sub-printed circuit board.

According to an embodiment, the plurality of temperature sensors may include a first temperature sensor disposed in a region adjacent to the charging IC and a second temperature sensor disposed on the sub-printed circuit board.

According to an embodiment, each of the plurality of temperature sensors may be a thermistor.

According to an embodiment, the processor may be configured to periodically obtain the temperature data by using the plurality of temperature sensors, while the processor is in a sleep state.

According to an embodiment, the processor may be configured to turn off the electronic device if the parameter is within the specified range.

According to an embodiment, the processor may be configured to adjust at least one of a charging voltage, a charging current, a swelling prevention temperature, and a rechargeable temperature range of the battery to lower the temperature of the battery if the parameter is within the specified range while the battery is being charged.

According to an embodiment, the processor may be configured to adjust at least one of the brightness of the display, an operating frequency of the processor, and a function of performance of an executing application to lower the temperature of the battery if the parameter is within the specified range while the battery is being discharged.

The term "module" used in this disclosure may include a unit composed of hardware, software and firmware and may be interchangeably used with the terms "unit," "logic," "logical block," "component," and "circuit." The "module" may be an integrated component for performing one or more functions or a part thereof. The "module" may be implemented mechanically or electronically and may include at least one of an application-specific IC (ASIC) chip, a field-programmable gate array (FPGA), and a programmable-logic device for performing some operations, which are known or will be developed. At least a part of an apparatus (e.g., modules or functions thereof) or a method (e.g., operations) according to various embodiments may be, for example, implemented by instructions stored in computer-readable storage media (e.g., the memory 130) in the form of a program module. The instruction, when executed by a processor (e.g., the processor 120), may cause the processor to perform a function corresponding to the instruction. A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and an internal memory. Also, a program instruction may include not only a mechanical code such as things generated by a compiler but also a high-level language code executable on a computer using an interpreter. A module or a program module according to various embodiments may include at least one of the above elements, or a part of the above elements may be omitted, or other elements may be further included. Operations performed by a module, a program module, or other elements according to various embodiments may be executed sequentially, in parallel, repeatedly, or in a heuristic method or some operations may be executed in different sequences or may be omitted. Alternatively, other operations may be added.

Certain components of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:
1. An electronic device comprising:
   a camera;
   a speaker;
   a display;
   a battery;
   a printed circuit board;
   a charging integrated circuit (IC) disposed on the printed circuit board to supply power to the battery;
   a communication circuit disposed on the printed circuit board to wirelessly communicate with an external device;
   a processor disposed on the printed circuit board and electrically connected to the camera, the speaker, the display, the battery, the charging IC, and the communication circuit; and
   a plurality of temperature sensors disposed in regions adjacent to two or more of the camera, the speaker, the charging IC, the communication circuit, and the processor, wherein the processor is configured to:
  obtain temperature data using the plurality of temperature sensors;
  compute a parameter associated with a temperature of the battery based on the temperature data and whether the battery is charged via wired charging or wireless charging;
  restrict a function or performance of at least one of the camera, the speaker, the display, the charging IC, the communication circuit, and the processor to lower the temperature of the battery if the parameter is within a specified range; and
  adjust a voltage or current for charging the battery based on a difference between the parameter and at least one of the temperature data.

2. The electronic device of claim 1, further comprising:
a power amplifier module (PAM) disposed on the printed circuit board and electrically connected to the communication circuit and the processor,
wherein the plurality of temperature sensors include a temperature sensor disposed in a region adjacent to the PAM, and
wherein the processor is configured to restrict the function or performance of at least one of the camera, the speaker, the display, the charging IC, the communication circuit, the processor, and the PAM to lower the temperature of the battery if the parameter is within the specified range.

3. The electronic device of claim 1, further comprising:
a power-receiving coil configured to wirelessly receive power from an external charger; and
a communication port configured to accommodate a communication connector,
wherein the charging IC is electrically connected to the power-receiving coil and the communication port,
wherein the plurality of temperature sensors are disposed in regions adjacent to two or more of the camera, the speaker, the charging IC, the communication circuit, the processor, and the power-receiving coil, and
wherein the processor is configured to restrict the function or performance of at least one of the camera, the speaker, the display, the charging IC, the communication circuit, the processor, and the power-receiving coil to lower the temperature of the battery if the parameter is within the specified range.

4. The electronic device of claim 1, further comprising:
a sub-printed circuit board electrically connected with the printed circuit board,
wherein the plurality of temperature sensors are disposed in a region adjacent to one or more of the camera, the speaker, the charging IC, the communication circuit, and the processor, and on the sub-printed circuit board.

5. The electronic device of claim 4, wherein the plurality of temperature sensors include a first temperature sensor disposed in a region adjacent to the charging IC and a second temperature sensor disposed on the sub-printed circuit board.

6. The electronic device of claim 1, wherein each of the plurality of temperature sensors is a thermistor.

7. The electronic device of claim 1, wherein the processor is configured to periodically obtain the temperature data using the plurality of temperature sensors, while the processor is in a low power state.

8. The electronic device of claim 1, wherein the processor is configured to turn off the electronic device if the parameter is within the specified range.

9. The electronic device of claim 1, wherein the processor is configured to adjust at least one of a swelling prevention temperature and a rechargeable temperature range of the battery to lower the temperature of the battery if the parameter is within the specified range while the battery is being charged.

10. The electronic device of claim 1, wherein the processor is configured to adjust at least one of a brightness of the display, an operating frequency of the processor, and a function or performance of an executing application to lower the temperature of the battery if the parameter is within the specified range while the battery is being discharged.

11. The electronic device of claim 1, further comprising:
a vibration motor,
wherein the processor is configured to output a notification using at least one of the speaker, the display, and the vibration motor if the parameter is within the specified range.

12. The electronic device of claim 1, wherein the processor is configured to remove the restriction if the parameter is beyond the specified range.

13. An electronic device comprising:
a battery configured to supply power to the electronic device;
at least one circuit board on which one or more components are disposed, wherein a first temperature sensor is disposed in a first region of the circuit board that is adjacent to a component in the one or more components, and a second temperature sensor is disposed in a second region away from the first region; and
a processor,
wherein the processor is configured to:
  measure a first temperature corresponding to the first region using the first temperature sensor;
  measure a second temperature corresponding to the second region or an outside of the electronic device using the second temperature sensor;
  determine a third temperature for the battery based on the first temperature and/or the second temperature and whether the battery is charged via wired charging or wireless charging;
  control the use of a resource of the electronic device when the third temperature satisfies a specified condition; and
  adjust a voltage or current for charging the battery based on a difference between the third temperature and the first temperature or the second temperature.

14. The electronic device of claim 13, wherein, to control the use of the resource, the processor is configured to turn off the electronic device.

15. The electronic device of claim 13, wherein, to control the use of the resource, the processor is configured to stop or suspend at least one application running in the electronic device.

16. The electronic device of claim 13, wherein the at least one circuit board includes a first circuit board and a second circuit board,
wherein the first temperature sensor is disposed on the first circuit board, and
wherein the second temperature sensor is disposed on the second circuit board.

17. A non-transitory computer-readable recording medium storing instructions executed by at least one processor included in an electronic device, wherein the instructions, when executed by the at least one processor, causes the at least one processor to:

measure a first temperature corresponding to a first region inside the electronic device using a first temperature sensor included in the electronic device;

measure a second temperature corresponding to a second region inside the electronic device or an outside of the electronic device using a second temperature sensor included in the electronic device;

determine a third temperature of a battery included in the electronic device based on the first temperature and/or the second temperature and whether the battery is charged via wired charging or wireless charging;

control the use of a resource of the electronic device when the third temperature state satisfies a specified condition; and adjust a voltage or current for charging the battery based on a difference between the third temperature and the first temperature or the second temperature.

18. The non-transitory computer-readable recording medium of claim 17, wherein the instruction causes the at least one processor to adjust a clock frequency of the processor or a brightness of a display included in the electronic device when the specified condition is satisfied while the battery is being discharged.

19. The non-transitory computer-readable recording medium of claim 17, wherein the voltage or current for charging the battery is adjusted while the battery is being charged using a charging circuit.

* * * * *